United States Patent
Goda

(10) Patent No.: US 8,019,113 B2
(45) Date of Patent: Sep. 13, 2011

(54) IMAGE PROCESSING APPARATUS, CONTROL METHOD THEREFORE, PROGRAM, AND STORAGE MEDIUM

(75) Inventor: Junichi Goda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 984 days.

(21) Appl. No.: 11/848,994

(22) Filed: Aug. 31, 2007

(65) Prior Publication Data

US 2008/0130943 A1    Jun. 5, 2008

(30) Foreign Application Priority Data

Dec. 5, 2006    (JP) ................... 2006-328521

(51) Int. Cl.
*G06K 9/00* (2006.01)

(52) U.S. Cl. ............... 382/100; 902/4; 283/68

(58) Field of Classification Search ............ 382/100, 382/115, 116, 124, 126; 235/380, 492; 704/246, 704/273; 902/3, 4, 25; 340/5.1, 5.2, 5.82, 340/5.83; 283/68; 356/71; 705/1, 26, 42; 707/2, 6, 7; 396/14, 15

See application file for complete search history.

(56) References Cited

U.S. PATENT DOCUMENTS

| | | | | |
|---|---|---|---|---|
| 5,473,144 A | * | 12/1995 | Mathurin, Jr. | 235/380 |
| 5,673,338 A | * | 9/1997 | Denenberg et al. | 382/209 |
| 6,269,169 B1 | * | 7/2001 | Funk et al. | 382/100 |
| 6,389,151 B1 | * | 5/2002 | Carr et al. | 382/100 |
| 6,748,533 B1 | * | 6/2004 | Wu et al. | 713/176 |
| 7,731,435 B2 | * | 6/2010 | Piersol et al. | 400/62 |
| 7,809,156 B2 | * | 10/2010 | Piersol et al. | 382/100 |
| 2005/0257064 A1 | * | 11/2005 | Boutant et al. | 713/180 |

FOREIGN PATENT DOCUMENTS

| | | | |
|---|---|---|---|
| JP | 2004-102562 A | 4/2004 |
| JP | 2004-112644 A | 4/2004 |
| JP | 2006-245949 A | 9/2006 |
| JP | 2006-311323 A | 11/2006 |

* cited by examiner

*Primary Examiner* — Anand Bhatnagar

(74) *Attorney, Agent, or Firm* — Canon USA, Inc. IP Division

(57) ABSTRACT

An image processing apparatus is configured to extract paper-fingerprint information from a printing sheet and to identify unique information unique to the printing sheet and attached to the printing sheet. The image processing apparatus is further configured to compare the identified unique information associated with the printing sheet with previously registered unique information and to store the unique information and the extracted paper-fingerprint information in association with each other when it is determined that the identified unique information matches the previously registered unique information.

23 Claims, 26 Drawing Sheets

SHIFTED ONE PIXEL IN THE HORIZONTAL DIRECTION

NOT SHIFTED IN THE VERTICAL DIRECTION

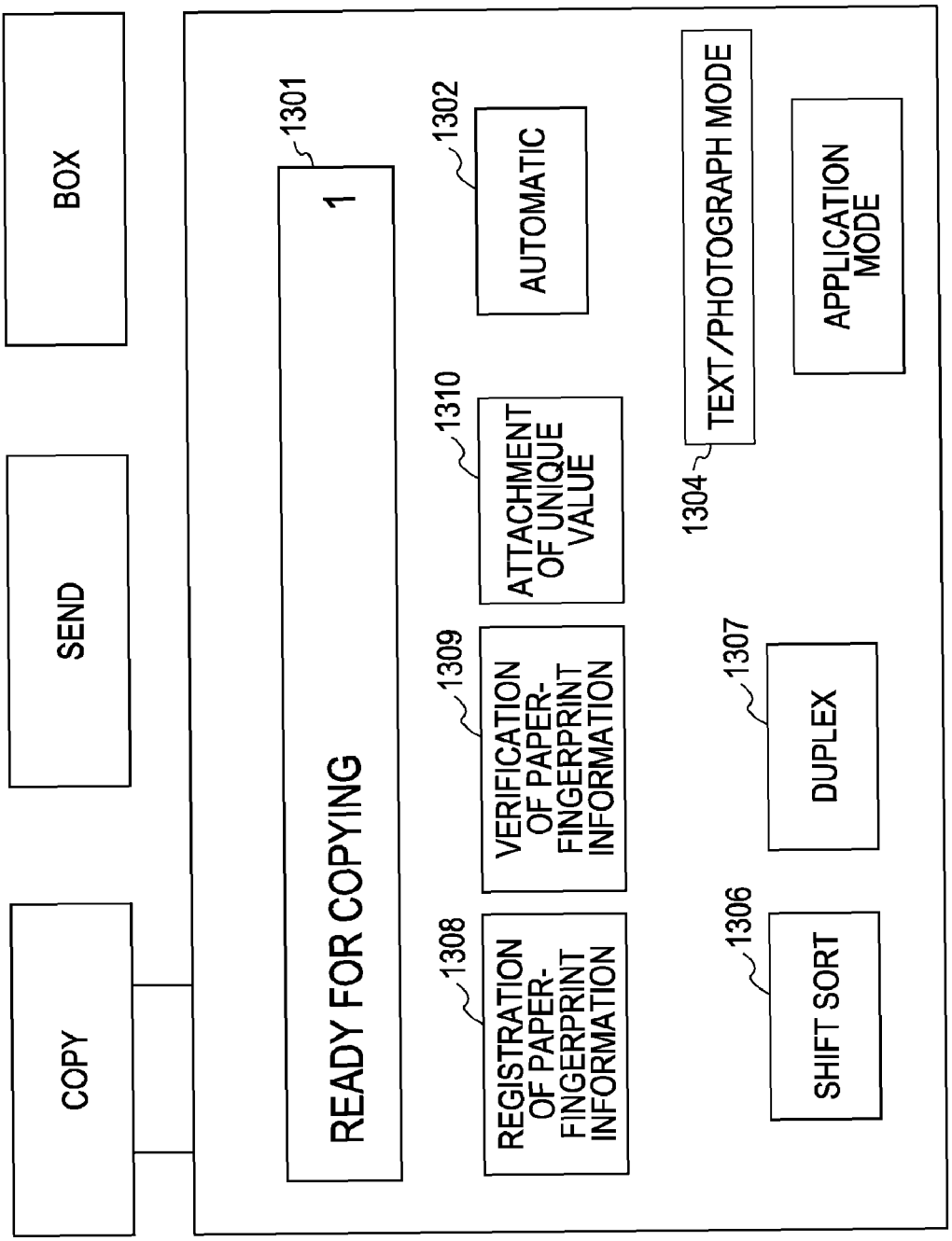

| UNIQUE VALUE | PAPER-FINGERPRINT INFORMATION | UNIQUE-VALUE-ADDED POSITION INFORMATION |
|---|---|---|
| UNIQUE VALUE 1 | PAPER-FINGERPRINT INFORMATION 1 | UNIQUE-VALUE-ADDED POSITION INFORMATION 1 |
| UNIQUE VALUE 2 | PAPER-FINGERPRINT INFORMATION 2 | UNIQUE-VALUE-ADDED POSITION INFORMATION 2 |
| : | : | : |
| : | : | : |

| UNIQUE VALUE | PAPER-FINGERPRINT INFORMATION | UNIQUE-VALUE-ADDED POSITION INFORMATION |
|---|---|---|
| 1 | | UNIQUE-VALUE-ADDED POSITION INFORMATION A |
| 2 | | UNIQUE-VALUE-ADDED POSITION INFORMATION B |

| UNIQUE VALUE | PAPER-FINGERPRINT INFORMATION | UNIQUE-VALUE-ADDED POSITION INFORMATION |
|---|---|---|
| 1 | PAPER-FINGERPRINT INFORMATION 1 | UNIQUE-VALUE-ADDED POSITION INFORMATION A |
| 2 | | UNIQUE-VALUE-ADDED POSITION INFORMATION B |
| ⋮ | ⋮ | ⋮ |
| ⋮ | ⋮ | ⋮ |
| 10 | PAPER-FINGERPRINT INFORMATION 10 | UNIQUE-VALUE-ADDED POSITION INFORMATION Z |

FIG. 25A

| UNIQUE VALUE | PAPER-FINGERPRINT INFORMATION |
|---|---|
| UNIQUE VALUE 1 | |
| UNIQUE VALUE 2 | |
| . . | |
| . . | |
| UNIQUE VALUE 100 | |
| . . | |
| UNIQUE VALUE 1000 | |
| . . | |

| UNIQUE VALUE | PAPER-FINGERPRINT INFORMATION |
|---|---|
| — | — |

| UNIQUE VALUE | PAPER-FINGERPRINT INFORMATION |
|---|---|
| UNIQUE VALUE 1 | |
| UNIQUE VALUE 2 | |
| . . | |
| . . | |
| UNIQUE VALUE 10 | |

100'

FIG. 26B
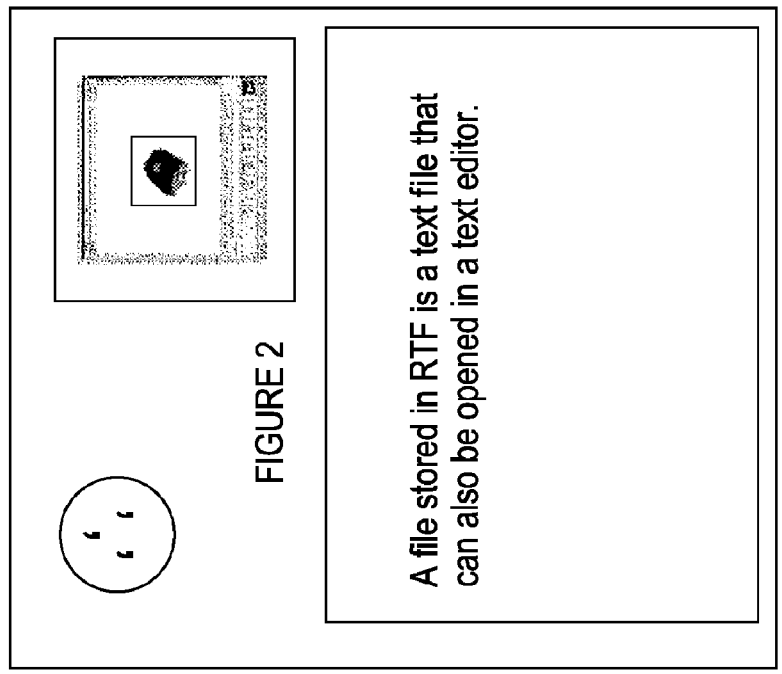
FIGURE 2
A file stored in RTF is a text file that can also be opened in a text editor.
FIG. 26A
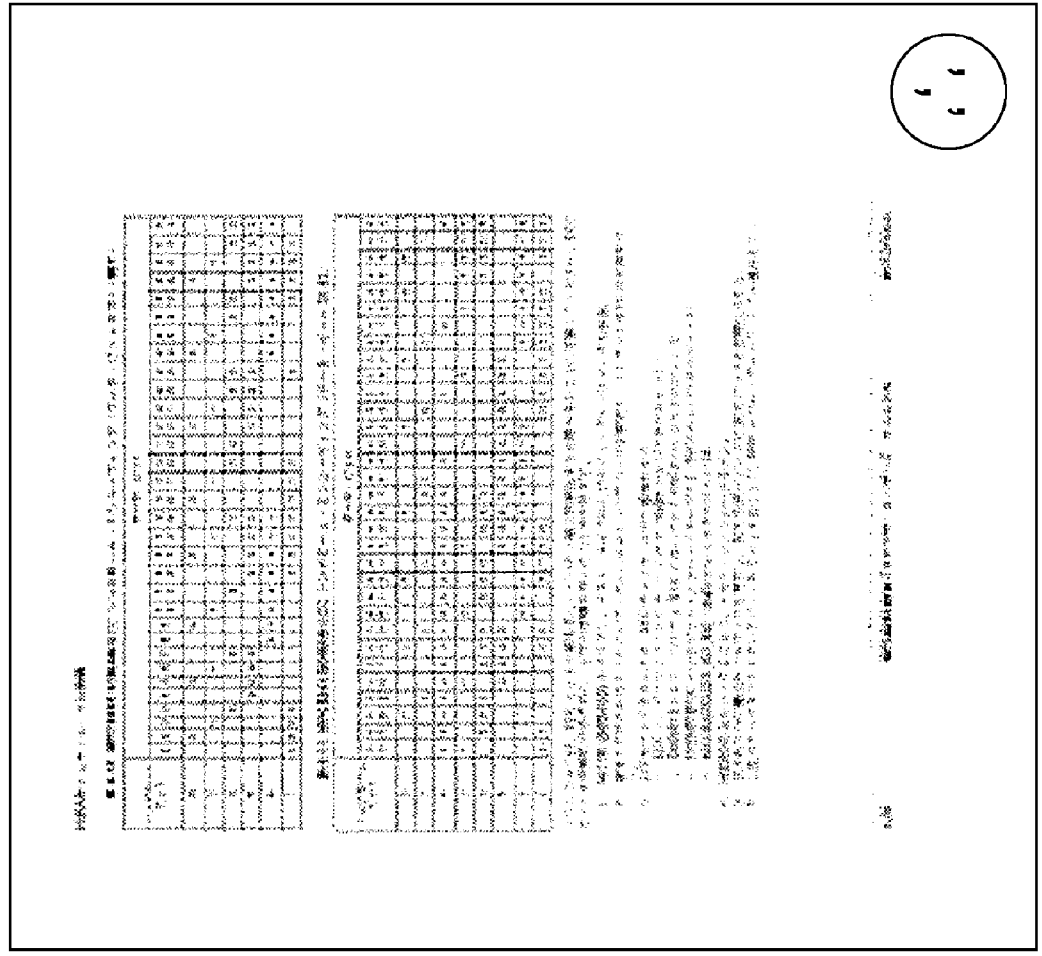

| UNIQUE VALUE | PAPER-FINGERPRINT INFORMATION | UNIQUE-VALUE-ADDED POSITION INFORMATION |
|---|---|---|
| CODE INFORMATION 1 | | UNIQUE-VALUE-ADDED POSITION INFORMATION A |
| CODE INFORMATION 2 | | UNIQUE-VALUE-ADDED POSITION INFORMATION B |

| UNIQUE VALUE | PAPER-FINGERPRINT INFORMATION | UNIQUE-VALUE-ADDED POSITION INFORMATION |
|---|---|---|
| CODE INFORMATION 1 | PAPER-FINGERPRINT INFORMATION 1 | UNIQUE-VALUE-ADDED POSITION INFORMATION A |
| CODE INFORMATION 2 | | UNIQUE-VALUE-ADDED POSITION INFORMATION B |
| ⋮ | ⋮ | ⋮ |
| ⋮ | ⋮ | ⋮ |
| CODE INFORMATION 10 | PAPER-FINGERPRINT INFORMATION 10 | UNIQUE-VALUE-ADDED POSITION INFORMATION Z |

IMAGE PROCESSING APPARATUS, CONTROL METHOD THEREFORE, PROGRAM, AND STORAGE MEDIUM

BACKGROUND OF THE INVENTION

1. Field of the Invention

The present invention relates to an image processing apparatus capable of handling paper-fingerprint information, a method for controlling the image processing apparatus, a program, and a storage medium.

2. Description of the Related Art

Documents for which the security of the original is important include public documents such as certificate of residence, certificate of insurance, and other confidential documents. With the advancement of printing technology, such paper documents can be printed using image forming apparatuses such as printers and copying machines, and protection against forgery using color scanners or color copying machines has been demanded.

One available technique for protection against forgery using color scanners or color copying machines is to embed a pattern, such as a copy-forgery-inhibited pattern, in paper to be printed such that when the paper is copied, the embedded copy-forgery-inhibited pattern becomes visible. Another technique is available to attach to paper a semiconductor component having data for authenticating the original, such as a contactless integrated circuit (IC) or radio-frequency identification (RFID) chip, so that a scanner or a copying machine, when copying the paper, can record information read from the semiconductor component to provide a record of copying. It has also been proposed to combine such a technique and a user authentication technique so that copying by a copying machine can be prohibited unless user authentication based on the information read from the semiconductor component is performed.

Further, it has also been proposed to embed specific halftone pattern information illegible to users as invisible information when a document is printed so that the printing operation can be terminated if a scanner or copying machine reads the information when copying the document.

However, the attachment of such a semiconductor component to paper causes an increase in the cost of the paper. There is another problem in that the scanner or copying machine may require special hardware to attach or read the invisible information or to support the above-described contactless IC or RFID chip, resulting in increased cost.

To addresses such problems, as disclosed in Japanese Patent Laid-Open No. 2004-112644, there has been recently proposed a technique utilizing a difference in the arrangement of fibers on a surface of a recording medium such as paper from one sheet of paper to another. In this technique, a surface of a recording medium such as paper is read using a reader of a scanner or a copying machine, and the read surface information such as the arrangement of fibers (generally referred to as "paper fingerprint" or the like) is converted as pattern data into digital information for recording. In the recording process, for example, the digital information is printed as a halftone pattern on a sheet of paper.

In the technique described above, when a recording medium such as paper once printed is then read for copying, information concerning the fiber pattern of the paper and digital information into which pattern data printed on the paper has been converted are compared to verify the authenticity of the original. This technique allows the authenticity of the original to be verified at low cost using existing scanners, printers, or copying machines only by modifying a portion of the software.

However, paper-fingerprint information (digital data into which a paper fingerprint read from paper has been converted) is registered by, first, scanning a sheet of printing paper (blank) for which the paper-fingerprint information is to be registered and reading the paper fingerprint. Further, the scanned sheet is placed on a print tray, and the read paper-fingerprint information is attached as a halftone pattern or the like to the sheet placed on the print tray. Therefore, a time-consuming operation is required to register the paper fingerprint. Further, when the read paper fingerprint is attached to the sheet, it may be necessary to correctly adjust the orientation, side, etc., of the sheet.

SUMMARY OF THE INVENTION

An embodiment of the present invention provides an image processing apparatus capable of easily handling paper-fingerprint information, a method for controlling the image processing apparatus, a program, and a storage medium.

According to an aspect of the present invention, an embodiment is directed to an image processing apparatus including a paper-fingerprint information extracting unit configured to extract paper-fingerprint information from a printing sheet; an identifying unit configured to identify unique information unique to the printing sheet and attached to the printing sheet; a comparing unit configured to compare the unique information identified by the identifying unit with previously registered unique information; and a first storage unit configured to store the unique information and the paper-fingerprint information extracted by the paper-fingerprint extracting unit in association with each other when the comparing unit determines that the unique information identified by the identifying unit matches the previously registered unique information.

Further features of the present invention will become apparent from the following description of exemplary embodiments with reference to the attached drawings.

BRIEF DESCRIPTION OF THE DRAWINGS

FIG. 13 is a diagram showing a user interface of an operation unit.

FIG. 14 is a diagram showing a unique-value/paper-fingerprint management table.

FIG. 22 is a diagram showing a state of the unique-value/paper-fingerprint management table.

FIGS. 25A to 25C are diagrams showing states of a unique-value/paper-fingerprint management table.

FIGS. 26A and 26B are diagrams showing an example print medium to which code information is attached as a unique value.

FIG. 30 is a diagram showing a state of the unique-value/paper-fingerprint management table.

DESCRIPTION OF THE EMBODIMENTS

Embodiments of the present invention will be described hereinafter with reference to the drawings.

First Exemplary Embodiment

A first exemplary embodiment of the present invention will be described in detail with reference to the drawings.

Figure 1:
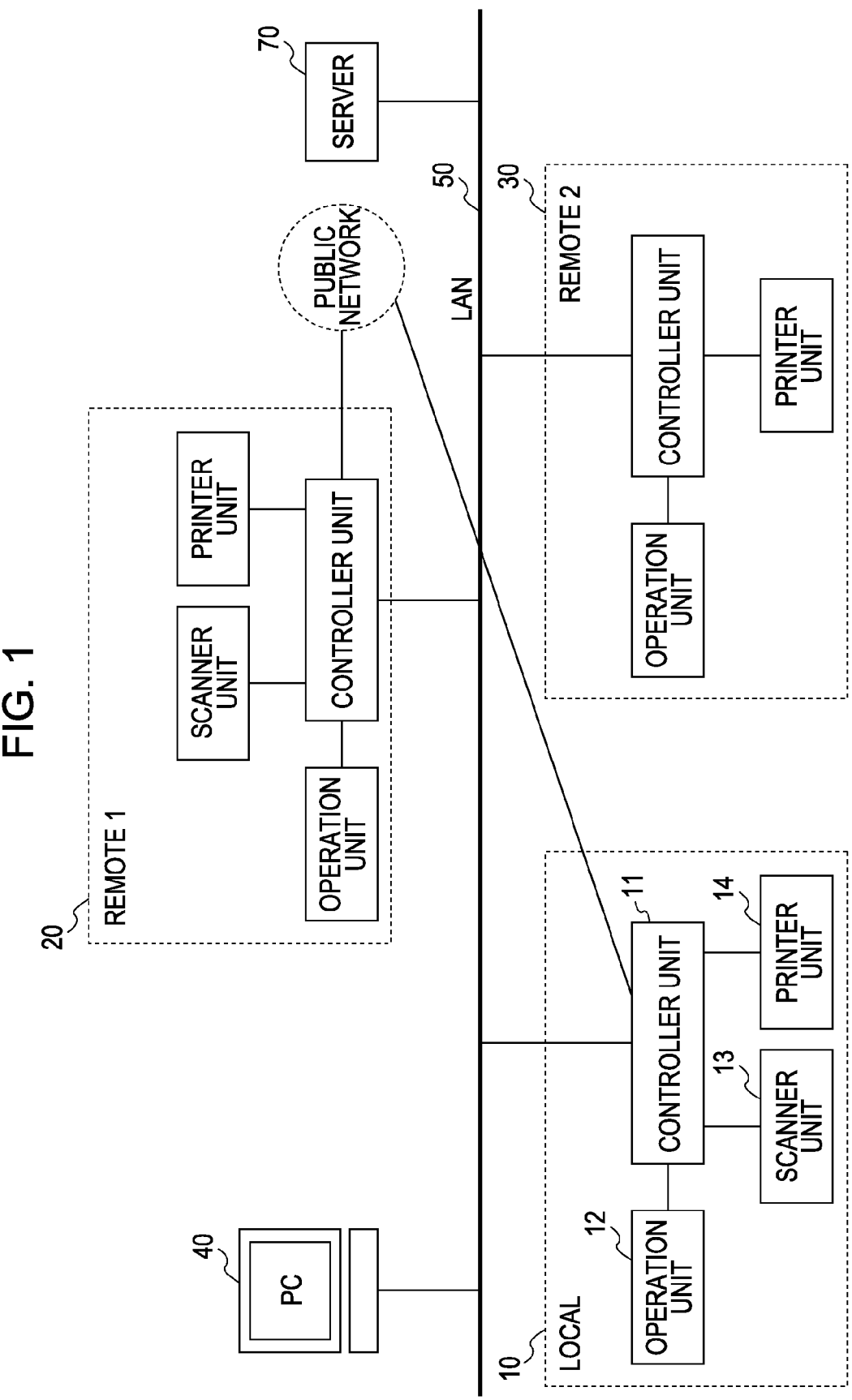
FIG. 1 is a diagram showing the overall structure of an image forming system.

FIG. 1 is a block diagram showing the structure of a printing system according to an embodiment of the present invention.

In the printing system shown in FIG. 1, a host computer (hereinafter referred to as a "PC") 40 and three image forming apparatuses (10, 20, and 30) are connected to a local area network (LAN) 50. In the printing system, the number of connected image forming apparatuses is not limited to three. In the first exemplary embodiment, a LAN is used as a connection method. However, the present invention is not limited to this connection method, and any other network such as a wide area network (WAN) (public network), a serial transmission system such as universal serial bus (USB), a parallel transmission system such as Centronics or SCSI (Small Computer System Interface) can also be used.

The PC 40 has a personal computer function. The PC 40 is capable of transmitting and receiving files or e-mail messages via the LAN 50 or a WAN using the File Transfer Protocol (FTP) or Server Message Block (SMB) protocol. The PC 40 is also capable of issuing printing instructions to the image forming apparatuses 10, 20, and 30 via a printer driver. A server 70 configured to manage print jobs or store data is further connected to the LAN 50.

The image forming apparatuses 10 and 20 have the same configuration. The image forming apparatus 30 has only a printing function, and does not include a scanner unit while the image forming apparatuses 10 and 20 include a scanner unit. In the following description, for ease of description, the structure of the image forming apparatuses 10 and 20 will be described in detail in the context of the image forming apparatus 10.

The image forming apparatus 10 includes a scanner unit 13 serving as an image inputting device, a printer unit 14 serving as an image outputting device, a controller unit 11 operable to control the overall operation of the image forming apparatus 10, and an operation unit 12 serving as a user interface (UI).

Figure 2:
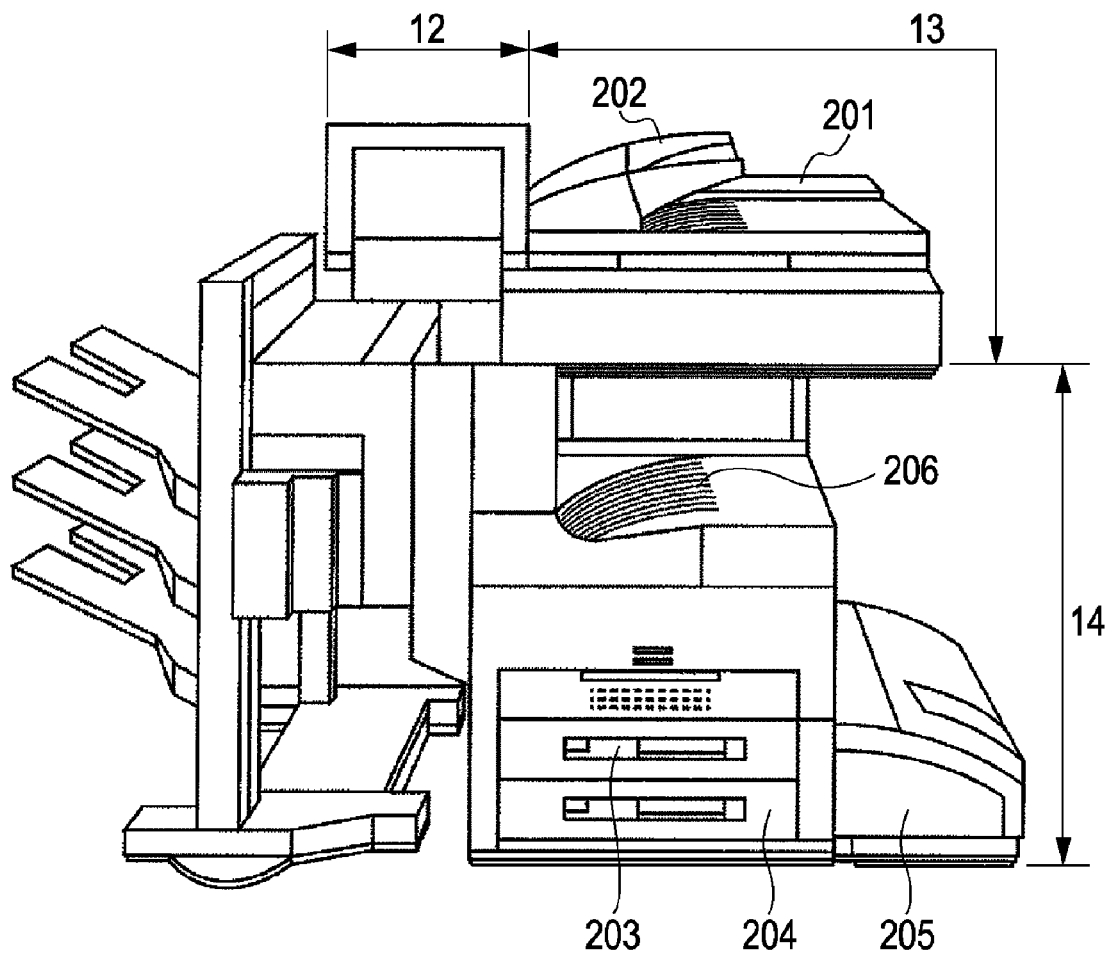
FIG. 2 is an external view of an input/output device of an image forming apparatus.

FIG. 2 is an external view of the image forming apparatus 10.

The scanner unit 13 includes a plurality of charge-coupled device (CCD) sensors. If the CCD sensors have different sensitivities, even when pixels on an original document have the same color density (printing sheet), it is recognized that the color densities of the pixels are different from each other. Therefore, the scanner unit 13 first scans a white plate (plate that appears uniformly white) with light, and converts the amount of reflected light obtained by scanning the plate with the light into an electrical signal. Then, the scanner unit 13 outputs the signal to the controller unit 11.

In the controller unit 11, as described below, a shading correction unit 500 shown in FIG. 5 recognizes a difference in sensitivity between the CCD sensors on the basis of electrical signals obtained from the CCD sensors. With the use of the recognized difference in sensitivity, the values of electrical signals obtained by scanning an image on the original document are corrected.

Upon receiving information for gain adjustment from a central processing unit (CPU) 301 in the controller unit 11, as described below, the shading correction unit 500 performs a gain adjustment in accordance with the received information. The gain adjustment is used to assign the values of the electrical signals obtained by scanning the original document with light to brightness signal values 0 to 255. With the gain adjustment, the values of the electrical signals obtained by scanning the original document with light are converted into high brightness signal values or low brightness signal values.

Next, a mechanism for scanning the image on the original document will be described.

The scanner unit 13 inputs the reflected light obtained by scanning the image on the original document with light to the CCD sensors to convert information concerning the image into electrical signals. The scanner unit 13 further converts the electrical signals into brightness signals of red (R), green (G), and blue (B), and outputs the brightness signals to the controller unit 11 as image data. Original documents are placed on a tray 202 of a document feeder 201.

When a user inputs an instruction to start reading documents using the operation unit 12, a document reading instruction is issued from the controller unit 11 to the scanner unit 13. In response to the instruction, the scanner unit 13 feeds the original documents one-by-one from the tray 202 of the document feeder 201 to read the original documents. The original documents may be scanned by, instead of automatic feed using the document feeder 201, placing each of the original documents on a glass platen (not shown) and moving an exposure unit.

The printer unit 14 is an image forming device arranged to form image data received from the controller unit 11 on a sheet of paper. In the first exemplary embodiment, an electrophotographic image forming method using a photosensitive drum or photosensitive belt is used. However, the present invention is not limited to this method, and any other suitable printing method such as an inkjet printing method in which ink is ejected from a fine nozzle array to print on a sheet of paper may be used. The printer unit 14 includes a plurality of paper cassettes 203, 204, and 205 that allow selection between different paper sizes or different paper orientations. Printed sheets are output to a paper output tray 206.

Figure 3:
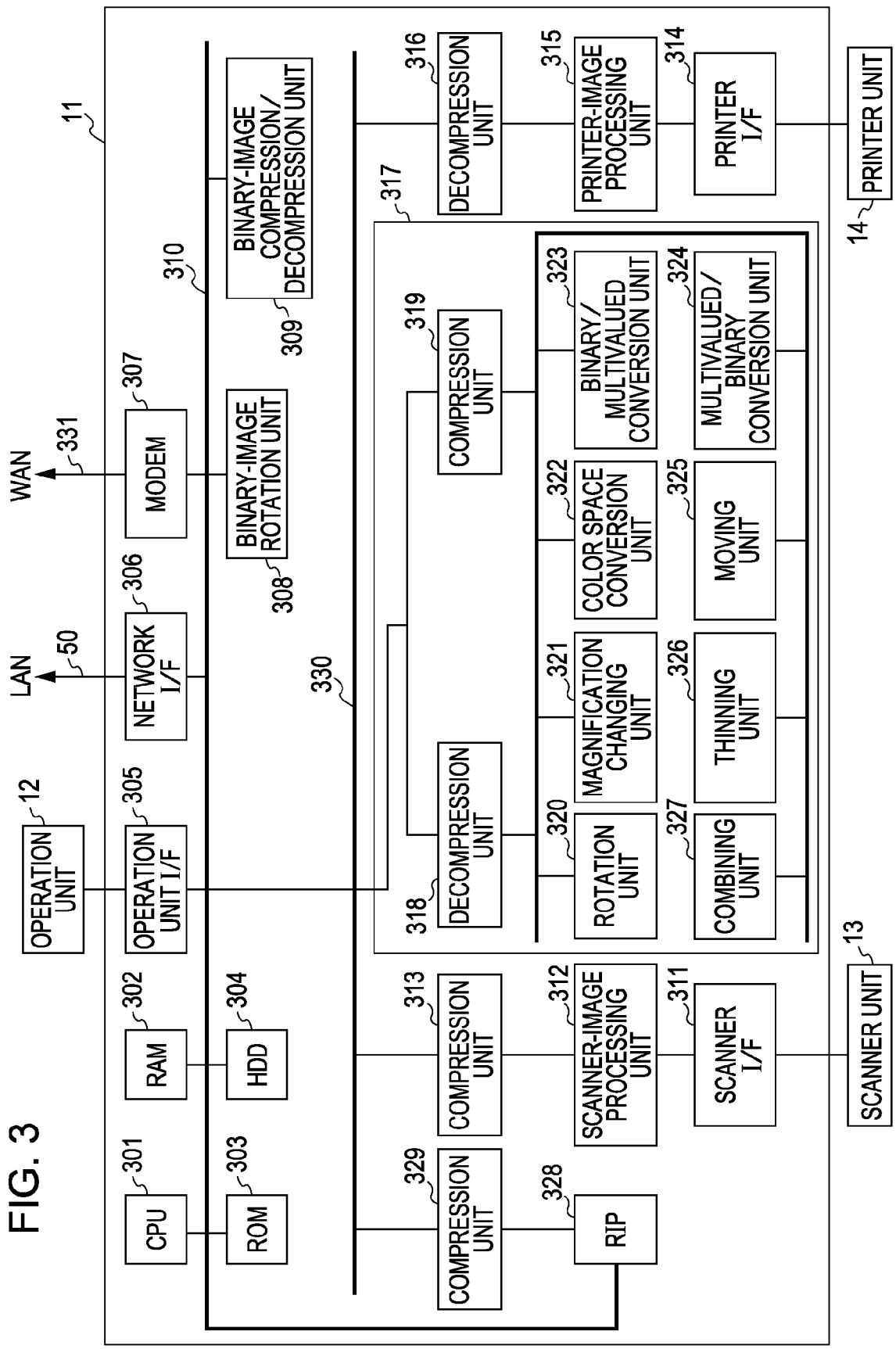
FIG. 3 is a diagram showing the overall structure of the image forming apparatus.

FIG. 3 is a block diagram showing components of the controller unit 11 of the image forming apparatus 10 in more detail.

The controller unit 11 is electrically connected to the scanner unit 13 and the printer unit 14, and is also connected to the PC 40, an external device, etc., via the LAN 50 or a WAN 331. With this configuration, image data or device information can be input into and output from the controller unit 11.

The CPU 301 controls overall access to various devices currently connected thereto according to a control program or the like stored in a read-only memory (ROM) 303, and also controls the overall processing performed within the controller unit 11. A random access memory (RAM) 302 is a system work memory used for the operation of the CPU 301, and is also a memory temporarily storing image data. The RAM 302 includes a non-volatile static RAM (SRAM) capable of holding the stored data even after the power is turned off, and a dynamic RAM (DRAM) from which the stored data is deleted after the power is turned off. The ROM 303 stores programs such as a boot program of the image forming apparatus 10. A hard disk drive (HDD) 304 is capable of storing system software and image data.

An operation unit interface (I/F) 305 is an interface unit configured to connect a system bus 310 to the operation unit 12. The operation unit I/F 305 receives image data to be displayed on the operation unit 12 from the system bus 310, and outputs the image data to the operation unit 12. Further, the operation unit I/F 305 outputs information input from the operation unit 12 to the system bus 310.

A network I/F 306 is connected to the LAN 50 and the system bus 310 to input and output information. A modem 307 is connected to the WAN 331 and the system bus 310 to input and output information. A binary-image rotation unit 308 converts the orientation of image data (i.e., rotates an image) to be transmitted. A binary-image compression/decompression unit 309 converts the resolution of image data to be transmitted into a predetermined resolution or a resolution suitable for the performance of the transmission destination. The compression and decompression process is performed using a coding method such as JBIG (Joint Bi-level Image Experts Group), MMR (Modified Modified Read), MR (Modified Read), or MH (Modified Huffman). An image bus 330 is a transmission path for exchanging image data, and is a PCI (Peripheral Component Interconnect) bus or an IEEE (the Institute of Electrical and Electronics Engineers) 1394 bus.

A scanner-image processing unit 312 corrects, modifies, and edits image data received from the scanner unit 13 via a scanner I/F 311. The scanner-image processing unit 312 can determine the type of the received image data, such as a color document or a white-and-black document, or a text document or a photographic document. The scanner-image processing unit 312 attaches the determination result to the image data. The attached information is referred to as "attribute data". The details of the operation of the scanner-image processing unit 312 are described below.

Figure 4:
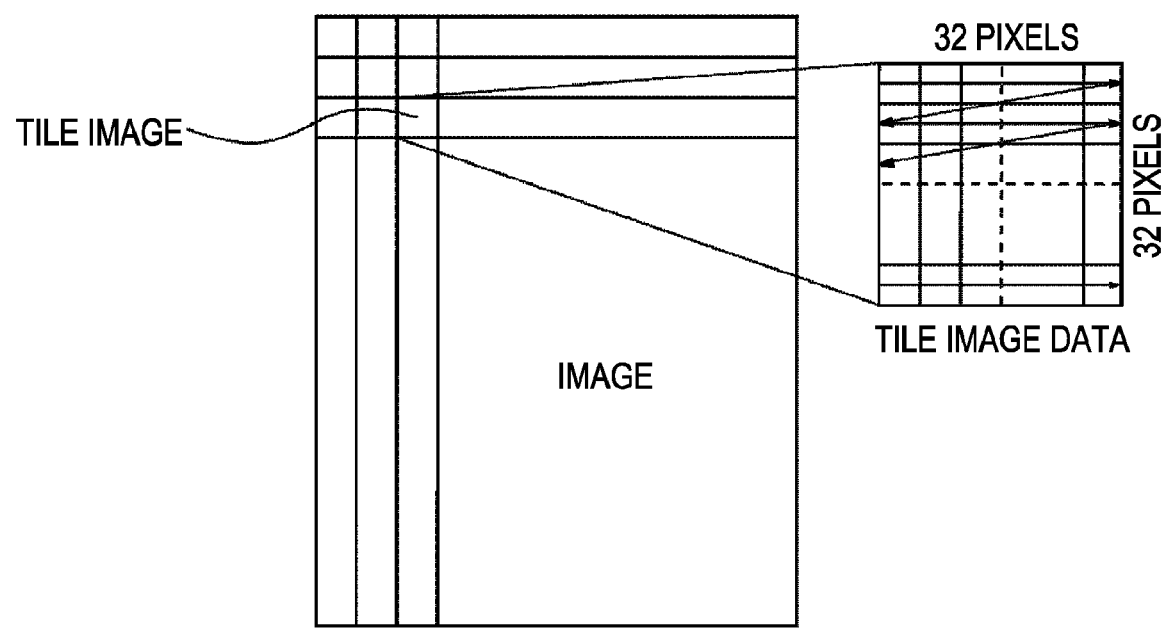
FIG. 4 is a diagram conceptually showing tile data.

A compression unit 313 receives image data from the scanner-image processing unit 312, and divides the image data into blocks each having 32 pixels by 32 pixels. The image data having 32×32 pixels is referred to as "tile data". FIG. 4 conceptually shows the tile data. In an original document (a paper medium that has not been read), a region corresponding to the tile data is referred to as a "tile image". The tile data has header information including average brightness information in the 32×32 pixel block and the coordinate position of the tile image on the original document. The compression unit 313 further compresses image data formed of a plurality of tile data sets. A decompression unit 316 decompresses the image data formed of the plurality of tile data sets, and converts the decompressed data into raster image data to delivery the raster image data to a printer-image processing unit 315.

The printer-image processing unit 315 receives the image data delivered from the decompression unit 316, and performs image processing on the image data while referring to the attribute data attached to the image data. The image data subjected to the image processing is output to the printer unit 14 via a printer I/F 314. The details of the operation of the printer-image processing unit 315 are described below.

An image conversion unit 317 performs a predetermined conversion on the image data. The image conversion unit 317 includes the following processing sections.

A decompression unit 318 decompresses the received image data. A compression unit 319 compresses the received image data. A rotation unit 320 rotates the received image data. A magnification changing unit 321 converts the resolution of the received image data (e.g., from 600 dots per inch (dpi) to 1200 dpi). A color space conversion unit 322 converts the color space of the received image data. The color space conversion unit 322 is operable to perform processing such as well-known background removal using a matrix or table, well-known logarithmic (LOG) conversion (from RGB to CMY), and well-known output-color correction (from CMY to CMYK). A binary/multivalued conversion unit 323 converts the received two-level image data into 256-level image data. A multivalued/binary conversion unit 324 converts the received 256-level image data into two-level image data using a technique such as an error diffusion method.

A combining unit 327 combines the received two sets of image data into one set of composite image data. When the two sets of image data is combined, an average of brightness values of pixels to be combined may be used as the composite brightness value of the pixels, or the brightness value of the pixel having a higher brightness level may be used as the composite brightness value of the pixels. Alternatively, the brightness value of the darker pixel may be used as the composite brightness value of the pixels. The composite brightness value can also be determined by performing an OR operation, an AND operation, an exclusive OR operation, or the like between pixels to be combined. Those combination methods are well known in the art.

A thinning unit 326 thins out pixels of the received image data to convert the resolution, and generates image data such as ½, ¼, or ⅛ image data. A moving unit 325 adds or removes a margin space to or from the received image data.

A raster image processor (RIP) 328 receives intermediate data generated on the basis of page description language (PDL) code data transmitted from the PC 40 or the like, and generates bitmap data (multivalued data). A compression unit 329 compresses the bitmap data received from the RIP 328.

Figure 5:
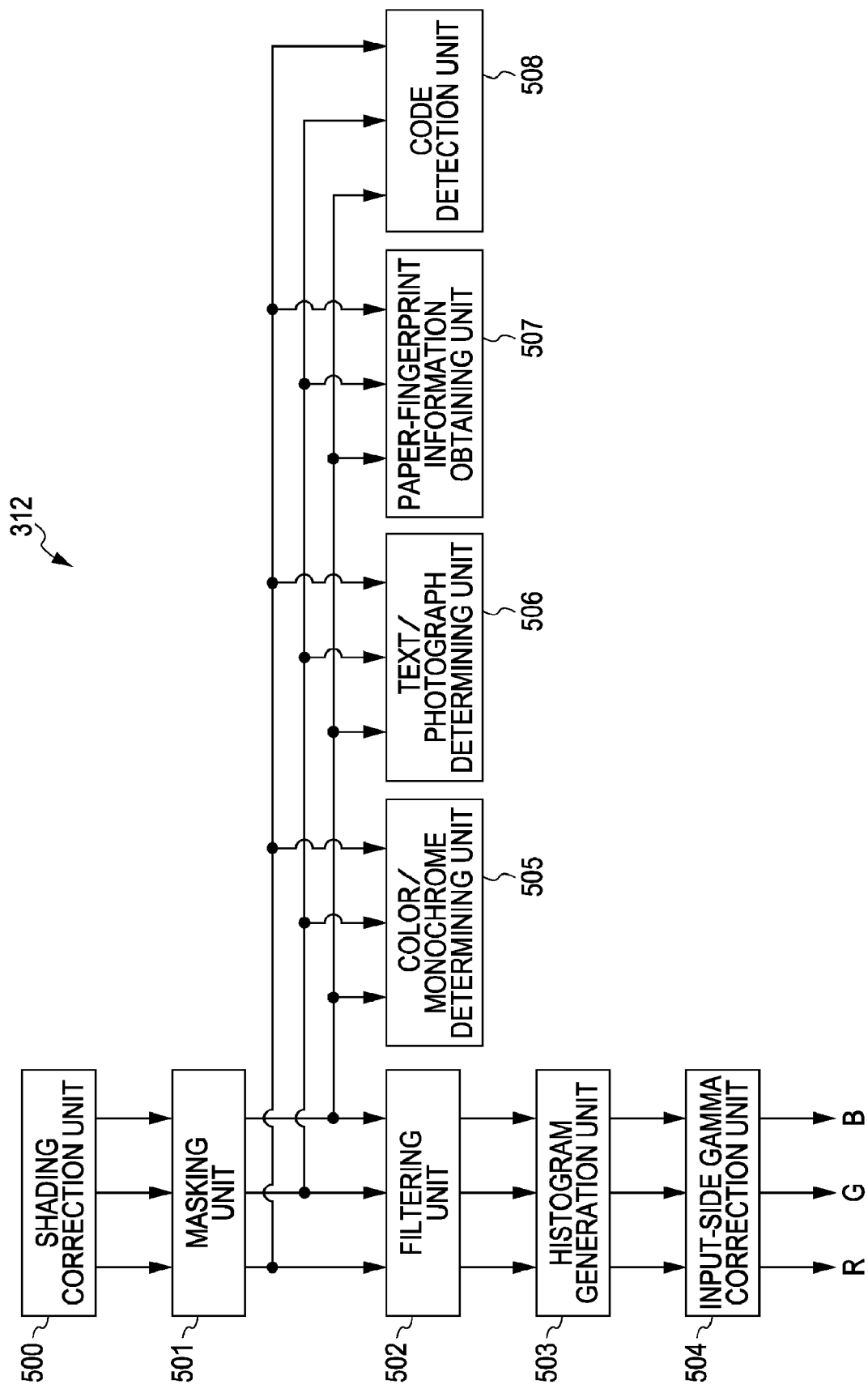
FIG. 5 is a block diagram of a scanner-image processing unit.

FIG. 5 shows the internal structure of the scanner-image processing unit 312.

The scanner-image processing unit 312 receives image data formed of 8-bit brightness signals of RGB colors.

The shading correction unit 500 performs a shading correction on the brightness signals. As described above, the shading correction is a process for preventing erroneous recognition of the brightness of the original document due to the difference in sensitivity between the CCD sensors. As described above, the shading correction unit 500 is operable to perform gain adjustment according to an instruction from the CPU 301.

Then, the brightness signals are converted by a masking unit 501 into standard brightness signals that do not depend on the colors of filters of the CCD sensors.

A filtering unit 502 appropriately corrects the spatial frequency of the received image data. For example, the filtering unit 502 performs an arithmetic operation on the received image data using a 7×7 matrix. In a copying machine or a multifunction machine, a user presses a tab 1304 shown in FIG. 13 to select a text mode, a photograph mode, or a text/photograph mode as a copy mode.

When the user selects the text mode, the filtering unit 502 applies a text filter to the entirety of the image data. When the photograph mode is selected, the filtering unit 502 applies a photographic filter to the entirety of the image data. When the text/photograph mode is selected, the filtering unit 502 adaptively switches between the filters on a pixel-by-pixel basis according to a text/photograph determination signal (part of the attribute data), as described below. That is, the application of the photographic filter or the text filter is determined on a pixel-by-pixel basis.

The photographic filter has a coefficient for smoothing out only the high-frequency components. Thus, surface roughness in the image can be reduced. The text filter has a coefficient for providing strong edge enhancement. Thus, character sharpness is increased.

A histogram generation unit 503 samples the brightness data of the pixels constituting the received image data. More specifically, the histogram generation unit 503 samples brightness data within a rectangular region defined by the specified main-scanning start and end points and sub-scanning start and end points with a constant pitch in the main-scanning and sub-scanning directions. The histogram generation unit 503 generates histogram data on the basis of the sampling results. The generated histogram data is used to estimate the level of the background in a background removing process. An input-side gamma correction unit 504 performs conversion into brightness data with non-linear characteristics using a table or the like.

A color/monochrome determining unit 505 determines whether each of the pixels constituting the received image is chromatic or achromatic, and attaches the determination results to the image data as color/monochrome determination signals (part of the attribute data).

A text/photograph determining unit 506 determines whether each of the pixels constituting the image data is a pixel constituting a character, a pixel constituting a halftone-dot area, a pixel constituting a character in a halftone-dot area, or a pixel constituting a solid image on the basis of the pixel value of each of the pixels and the pixel values of the neighboring pixels. A pixel that is not any of the above pixels is a pixel constituting a white area. The text/photograph determining unit 506 attaches the determination results to the image data as text/photograph determination signals (part of the attribute data).

A paper-fingerprint information obtaining unit (paper-fingerprint information extracting unit) 507 obtains image data corresponding to a predetermined region in the RGB image data input from the shading correction unit 500. The details are described as follows.

Figure 6:
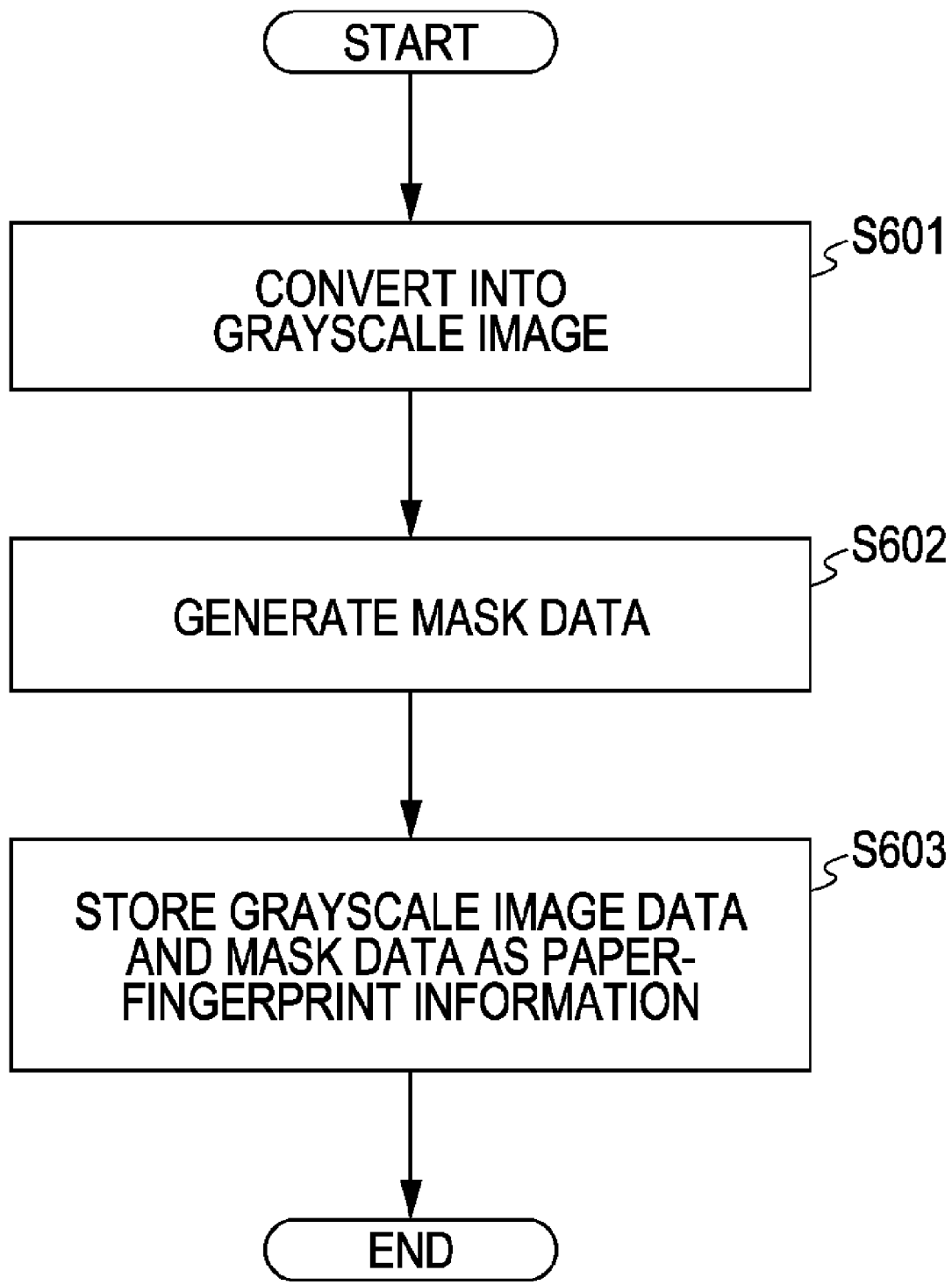
FIG. 6 is a flowchart showing a paper-fingerprint information obtaining process.

FIG. 6 is a flowchart showing a paper-fingerprint information obtaining process performed by the paper-fingerprint information obtaining unit 507.

In step 601, the image data extracted by the paper-fingerprint information obtaining unit 507 is converted into grayscale image data. In step 602, components that can cause erroneous determination, such as a printed or handwritten character, are removed from the image converted into the grayscale image data in step 601 to generate mask data for matching. The mask data is binary data having a value of "0" or "1". In the grayscale image data, for a pixel having a brightness signal value not less than a first threshold value (i.e., bright pixel), the value of the mask data is set to "1". For a pixel having a brightness signal value less than the first threshold value, the value of the mask data is set to "0".

The above-described process is performed for each of the pixels included in the grayscale image data. In step 603, the two types of data, i.e., the grayscale image data converted in step 601 and the mask data generated in step 602, are obtained as paper-fingerprint information.

The paper-fingerprint information obtaining unit 507 transmits the paper-fingerprint information concerning the predetermined region to the RAM 302 using a data bus (not shown) to store the paper-fingerprint information in the RAM 302.

A code detection unit 508 shown in FIG. 5 detects the presence of code image data if the image data output from the masking unit 501 includes code image data. The code detection unit 508 decodes the detected code image data to retrieve information.

Figure 7:
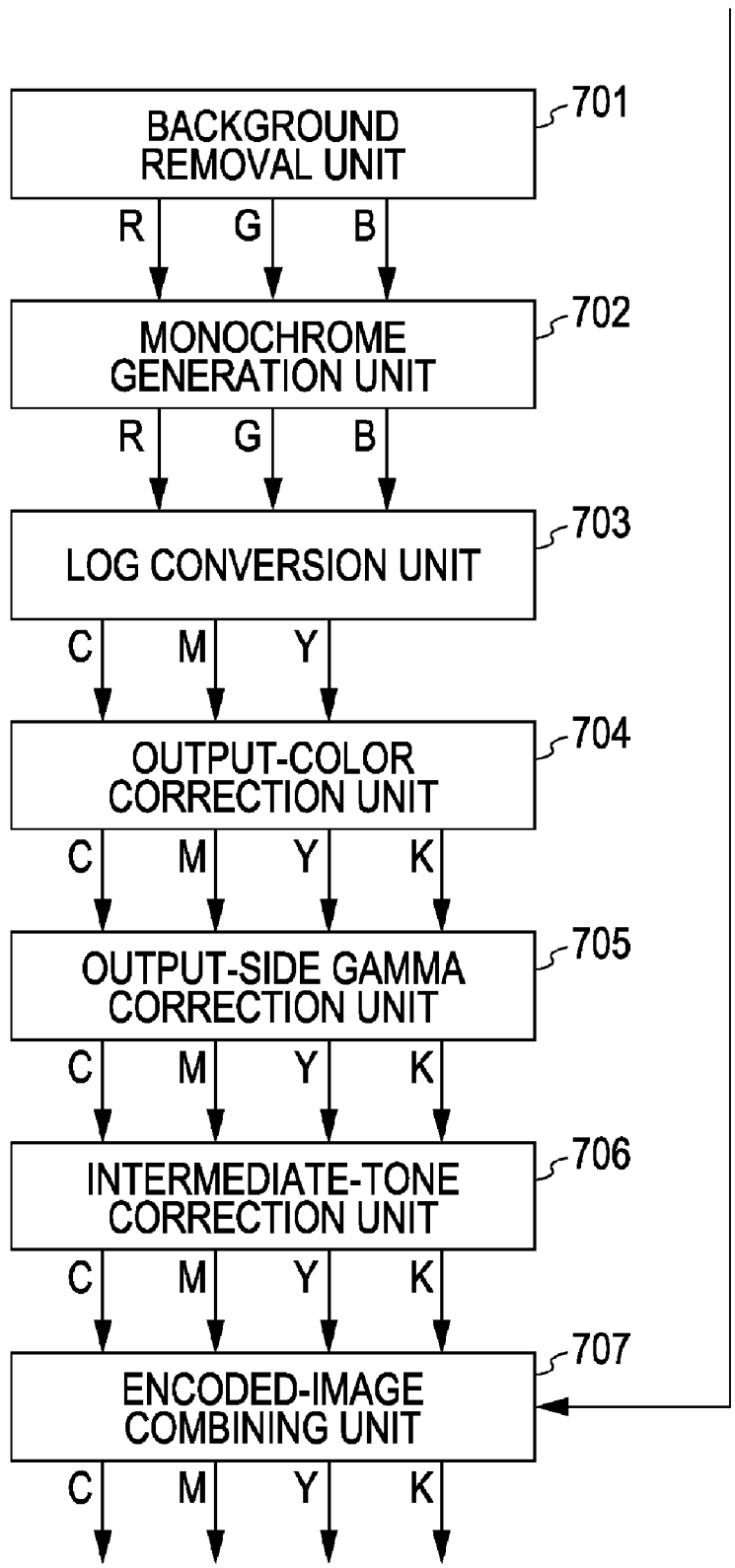
FIG. 7 is a block diagram of a printer-image processing unit.

FIG. 7 shows the flow of a process performed by the printer-image processing unit 315.

A background removal unit 701 removes (or eliminates) the background color of the image data using the histogram generated by the scanner-image processing unit 312. A monochrome generation unit 702 converts color data into monochrome data according to the color/monochrome determination results. A LOG conversion unit 703 performs brightness-density conversion. For example, the LOG conversion unit 703 converts input RGB image data into CMY image data.

An output-color correction unit 704 performs output-color correction. For example, the output-color correction unit 704 converts input CMY image data into CMYK image data using a predetermined table or matrix. An output-side gamma correction unit 705 performs correction so that the signal values input to the output-side gamma correction unit 705 and the reflection density of the output copy are proportional to each other. An intermediate-tone correction unit 706 performs intermediate-tone processing according to the number of tone levels of the printer unit 14 to which the image is output. For example, the intermediate-tone correction unit 706 performs binarization or 32-valued processing on the received high-tone image data.

An encoded-image combining unit 707 combines the (original) image corrected by the intermediate-tone correction unit 706 with a special code generated by the CPU 301 or a code generator (not shown), such as a two-dimensional barcode. The image to be combined is delivered to the encoded-image combining unit 707 via a path (not shown).

The processing sections in the scanner-image processing unit 312 and the printer-image processing unit 315 can output the received image data without performing any processing. Data transferred through a certain processing section without being subjected to any processing may be referred to as "data passing through the processing section".

A finger-print information matching process will now be described.

The CPU 301 is operable to perform control to read the paper-fingerprint information transmitted from the paper-fingerprint information obtaining unit 507 to the RAM 302 to match the read paper-fingerprint information with other paper-fingerprint information. The term other paper-fingerprint information means paper-fingerprint information already registered in the server 70, as described below, or paper-fingerprint information already registered in the HDD 304.

Figure 8:
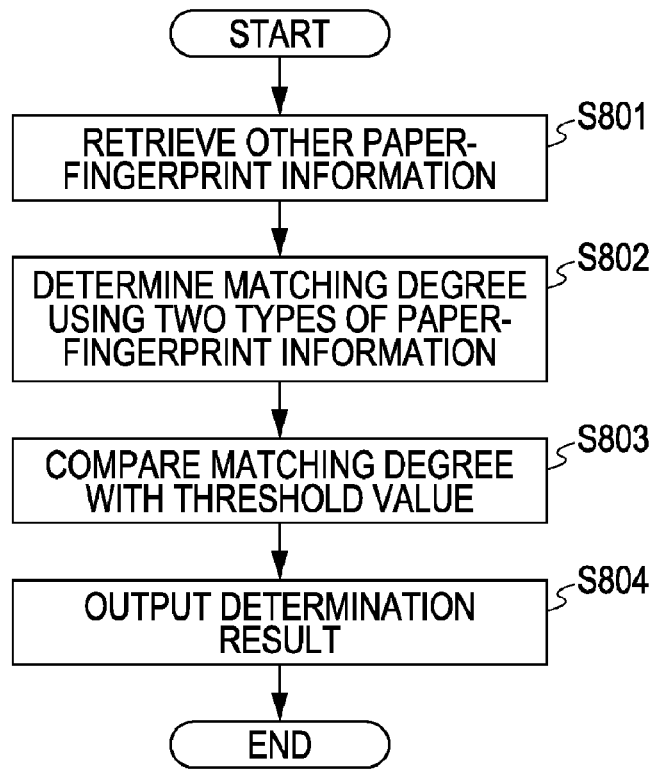
FIG. 8 is a flowchart showing a paper-fingerprint information matching process.

FIG. 8 is a flowchart showing the paper-fingerprint information matching process. Steps of the process shown in the flowchart of FIG. 8 are generally controlled by the CPU 301.

In step S801, the paper-fingerprint information registered in the server 70 or the paper-fingerprint information registered in the HDD 304 is retrieved to the RAM 302.

In step S802, a degree of matching between the paper-fingerprint information transmitted from the paper-fingerprint information obtaining unit 507 and the paper-fingerprint information extracted in step S801 is determined using equation (1) below in order to determine matching therebetween. It is assumed that in the matching between two paper fingerprints, one of the paper fingerprints is produced by displacing the other paper fingerprint. An error image E between the two pieces of paper-fingerprint information is determined when the value determined by shifting the functions in equation (1) by one pixel is minimum, i.e., when the difference between the two pieces of paper-fingerprint information is minimum.

$$E(i, j) = \frac{\sum_{x,y} \alpha_1(x, y)\alpha_2(x-i, y-j)\{f_1(x, y) - f_2(x, y)\}^2}{\sum_{x,y} \alpha_1(x, y)\alpha_2(x-i, y-j)} \quad (1)$$

In equation (1), $\alpha_1$ denotes the mask data in the (registered) paper-fingerprint information retrieved in step S801; $f_1$ denotes the grayscale image data in the (registered) paper-fingerprint information retrieved in step S801; $\alpha_2$ denotes the mask data in the (currently retrieved) paper-fingerprint information transmitted from the paper-fingerprint information obtaining unit 507 in step S802; and $f_2$ denotes the grayscale image data in the (currently retrieved) paper-fingerprint information transmitted from the paper-fingerprint information obtaining unit 507 in step S802.

Figure 9:
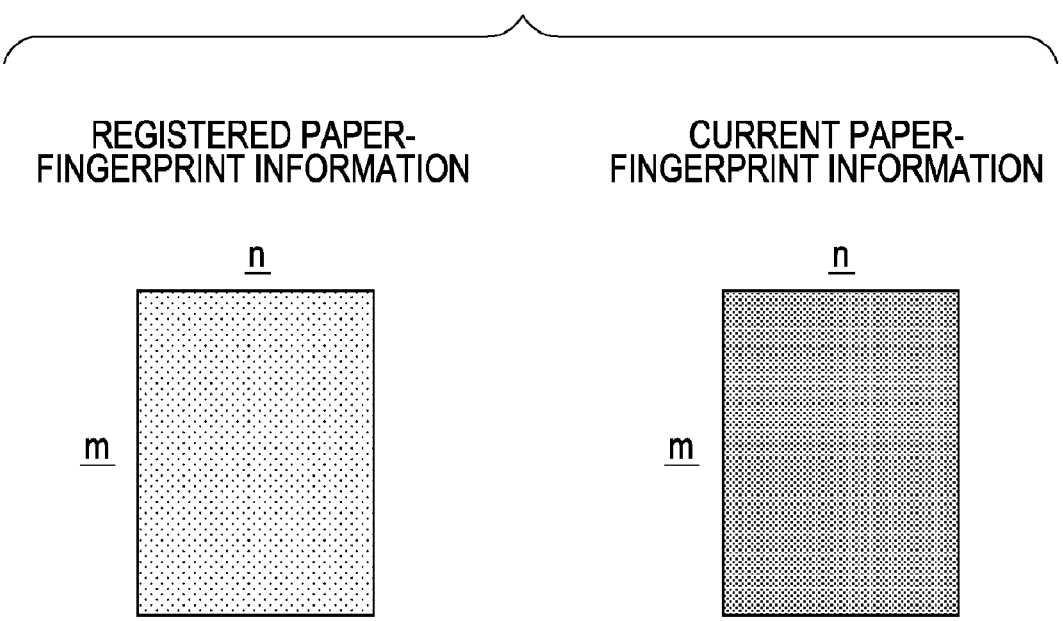
FIG. 9 is a diagram showing previously registered paper-fingerprint information and currently obtained paper-fingerprint information.

A specific method for determining the degree of matching will be described with reference to FIGS. 9, 10A to 10D, 11A, 11B, 12A, and 12B. FIG. 9 is an image diagram showing the registered paper-fingerprint information and the currently obtained paper-fingerprint information. Each of the registered paper-fingerprint information and the current paper-fingerprint information images has n pixels in the horizontal direction and m pixels in the vertical direction.

In equation (1), functions i and j are shifted by one pixel within a range of (−n+1) to (n−1) pixels and (m+1) to (m−1) pixels, respectively, and (2n−1)×(2m−1) error values E(i, j) between the registered paper-fingerprint information and the current paper-fingerprint information are determined. That is, error values E(−n+1, −m+1) to E(n−1, m−1) are determined.

Figure 10A:
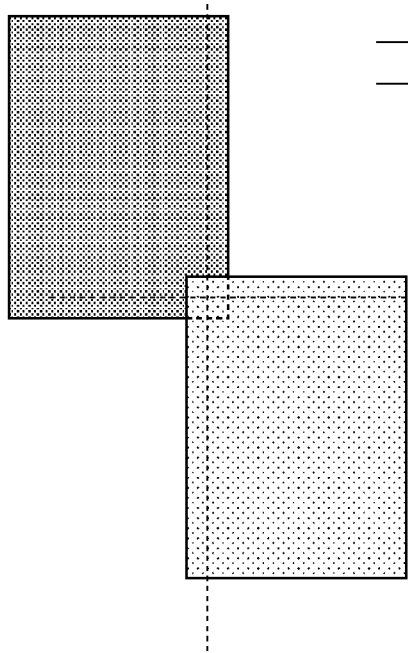
FIG. 10A is a diagram showing the determination of the error value $E(-n+1, -m+1)$.
Figure 10B:
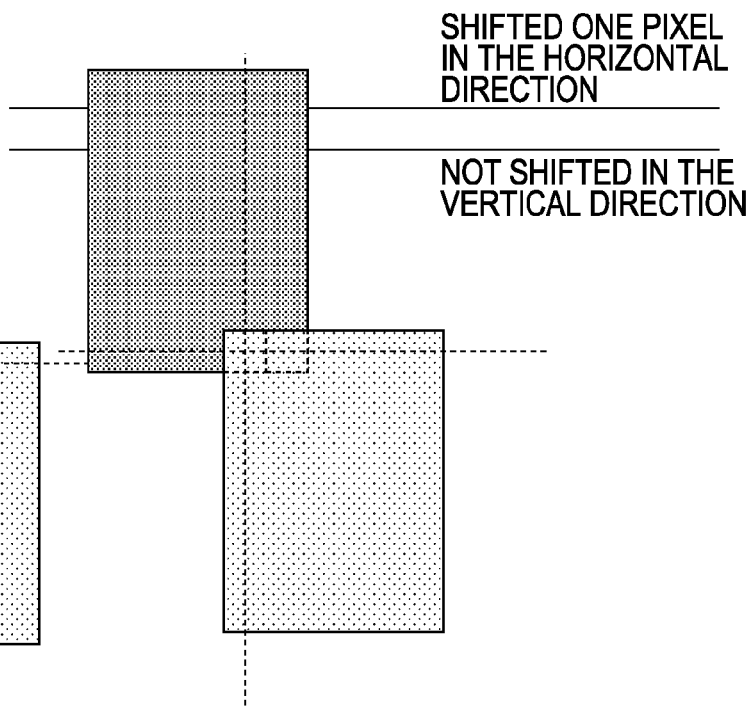
FIG. 10B is a diagram showing the determination of the error value $E(-n+2, -m+1)$.
Figure 10C:
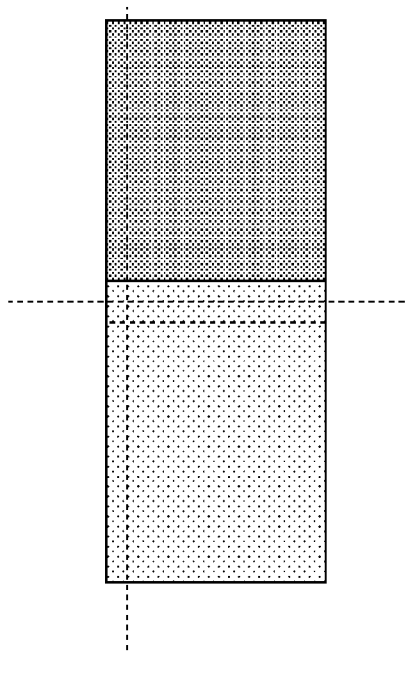
FIG. 10C is a diagram showing the determination of the error value $E(0, -m+1)$.
Figure 10D:
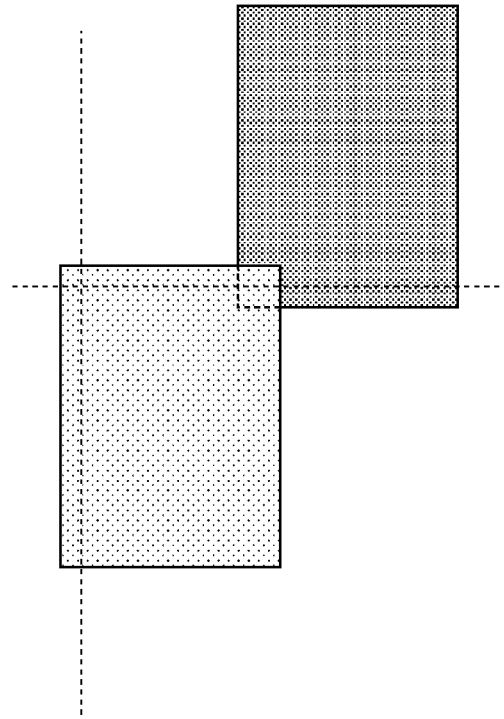
FIG. 10D is a diagram showing the determination of the error value E(n−1, −m+1).

FIG. 10A is a diagram showing an image in which a lower-right pixel of the current paper-fingerprint information overlaps an upper-left pixel of the registered paper-fingerprint information. In the state shown in FIG. 10A, the error value E(−n+1, −m+1) is determined by the functions of equation (1). FIG. 10B is diagram showing an image in which the current paper-fingerprint information is shifted to the right by one pixel with respect to that shown in FIG. 10A. In the state shown in FIG. 10B, the error value E(−n+2, −m+1) is determined by the functions of equation (1). A further calculation is performed with the current paper-fingerprint information being shifted in a manner similar to that described above. In FIG. 10C, the current paper-fingerprint information is shifted to the position where the current paper-fingerprint information and the registered paper-fingerprint information overlap each other, and therefore the error value E(0, −m+1) is determined. In FIG. 10D, the current paper-fingerprint information is shifted to the position where a rightmost pixel of the current paper-fingerprint information overlaps a leftmost pixel of the registered paper-fingerprint information, and the error value E(n−1, −m+1) is determined. In this manner, as the current paper-fingerprint information is shifted in the horizontal direction, the coordinate i of the error value E(i, j) is incremented by one, and the error value E(i, j) is determined.

Figure 11A:
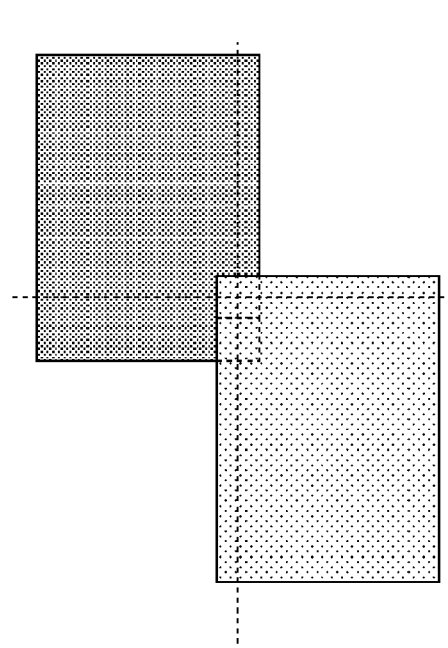
FIG. 11A is a diagram showing the determination of the error value E(−n+1, −m+2).

In FIG. 11A, likewise, the current paper-fingerprint information is shifted down by one pixel in the vertical direction with respect to that shown in FIG. 11A, and the error value E(−n+1, −m+2) is determined.

Figure 11B:
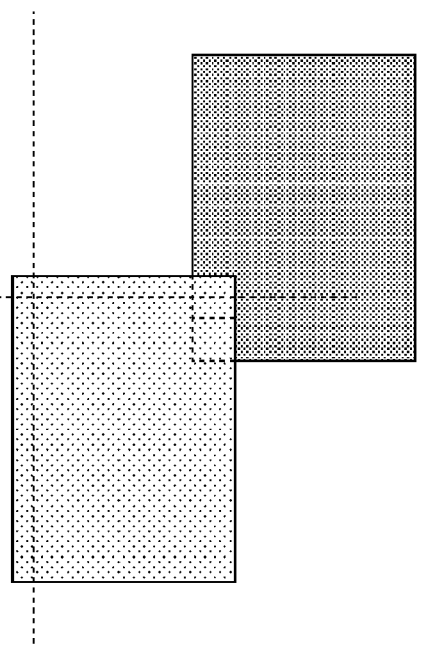
FIG. 11B is a diagram showing the determination of the error value E(n−1, −m+2).

In FIG. 11B, the current paper-fingerprint information is shifted relative to that shown in FIG. 11A to the position where a rightmost pixel of the current paper-fingerprint information overlaps a leftmost pixel of the registered paper-fingerprint information, and the error value E(n−1, −m+2) is determined.

Figure 12A:
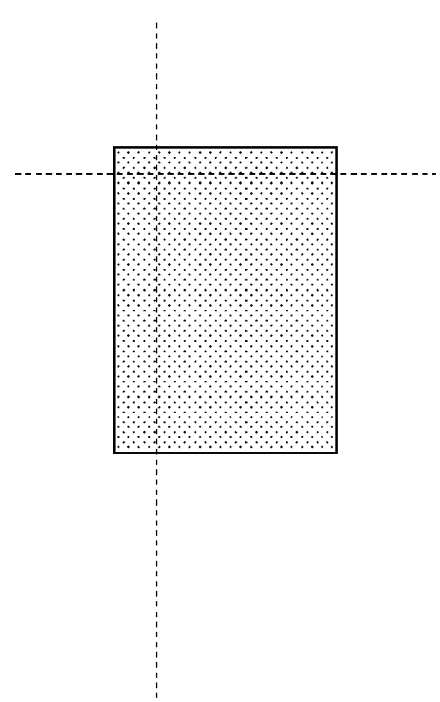
FIG. 12A is a diagram showing the determination of the error value E(0, 0).

FIG. 12A shows the case where the registered paper-fingerprint information and the current paper-fingerprint information are located at the same position (that is, they completely overlap each other), and the current error value E(i, j) is equal to the error value E(0, 0).

Figure 12B:
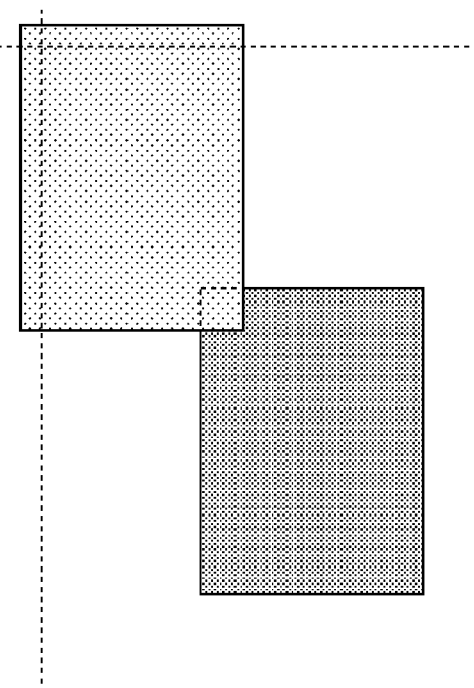
FIG. 12B is a diagram showing the determination of the error value E(n−1, m−1).

The images are shifted in a manner similar to that described above so that the current paper-fingerprint information and the registered paper-fingerprint information overlap at least one pixel, and a calculation is performed. Finally, as shown in FIG. 12B, the error value E(n−1, m−1) is determined.

Accordingly, a set of (2n−1)×(2m−1) error values E(i, j) are determined.

To understand equation (1), it is assumed that i=0, j=0, $\alpha_1(x, y)=1$ (where x=0 to n and y=0 to m), and $\alpha_2(x−i, y−j)=1$ (where x=0 to n and y=0 to m). That is, it is assumed that the error value E(0, 0) is determined when $\alpha_1(x, y)=1$ (where x=0 to n and y=0 to m) and $\alpha_2(x−i, y−j)=1$ (where x=0 to n and y=0 to m).

When i=0 and j=0, the registered paper-fingerprint information and the current paper-fingerprint information are located at the same position in the manner shown in FIG. 12A.

When $\alpha_1(x, y)=1$ (where x=0 to n and y=0 to m), the intensities of all the pixels of the registered paper-fingerprint information are high. In other words, no colorant such as toner or ink or no dust or dirt is present on a paper-fingerprint region when the registered paper-fingerprint information was obtained.

When $\alpha_2(x-i, y-j)=1$ (where x=0 to n and y=0 to m), the intensities of all the pixels of the current paper-fingerprint information are high. In other words, as in $\alpha_1$, no colorant such as toner or ink or no dust or dirt is present on a paper-fingerprint region when the current paper-fingerprint information was obtained.

Therefore, if $\alpha_1(x, y)=1$ and $\alpha_2(x-i, y-j)=1$ are satisfied for all the pixels, equation (1) is represented as follows:

$$E(0, 0) = \sum_{x=0, y=0}^{n, m} \{f_1(x, y) - f_2(x, y)\}^2$$

Where $\{f_1(x, y)-f_2(x, y)\}^2$ represents the square value of the difference between the grayscale image data in the registered paper-fingerprint information and the grayscale image data in the current paper-fingerprint information. Thus, equation (1) is equal to the sum of the squares of the differences at the individual pixels between the two pieces of paper-fingerprint information. That is, as the number of pixels for which $f_1(x, y)$ and $f_2(x, y)$ are similar increases, the error value E(0, 0) has a small value.

While the foregoing description has been given in the context of the error value E(0, 0), the same applies to other error values E(i, j). Since the error value E(i, j) has a small value as the number of pixels for which $f_1(x, y)$ and $f_2(x, y)$ are similar increases, it can be found that if E(k, l)=min{E(i, j)}, the position at which the registered paper-fingerprint information was obtained and the position at which the current paper-fingerprint information was obtained are deviated by the values k and l from each other.

The numerator of equation (1) represents the result of multiplying $\{f_1(x, y)-f_2(x-i, y-j)\}^2$ by $\alpha_1$ and $\alpha_2$ (more specifically, the sum is determined using sigma ($\Sigma$) notation). The values $\alpha_1$ and $\alpha_2$ are set to 0 for a pixel having a high-density color and to 1 for a pixel having a low-density color.

Therefore, if either of (or both) the values $\alpha_1$ and $\alpha_2$ is (or are) set to 0, $\alpha_1\alpha_2\{f_1(x, y)-f_2(x-i, y-j)\}^2$ yields 0. That is, if a target pixel in either of (or both) the pieces of paper-fingerprint information has a high-density color, the difference in color density in that pixel is not taken into account. This is because pixels having dust or colorant deposited thereon are ignored.

In equation (1), for the reason described above, the number of elements to be summed using sigma notation increases or decreases. Therefore, the numerator of equation (1) is divided by the total, i.e., $\Sigma\alpha_1(x, y)\alpha_2(x-i, y-j)$, to perform normalization. The error value E(i, j) obtained when $\Sigma\alpha_1(x, y)\alpha_2(x-i, y-j)$ in the denominator of equation (1) yields 0 is not included in the set of error values (E(-(n-1), -(m-1)) to E(n-1, m-1)), as described below.

As described above, if E(k, l)=min{E(i, j)}, it can be found that the position at which the registered paper-fingerprint information was obtained and the position at which the current paper-fingerprint information was obtained are deviated from each other by the values k and l.

The value (hereinafter referred to as a "matching degree") indicating the degree of similarity between the two pieces of paper-fingerprint information is determined using the error value E(k, l) and other error values E(i, j).

First, a set of error values is determined by the functions of equation (1) (e.g., E(0, 0)=10, E(0, 1)=50, E(1, 0)=50, and E(1, 1)=50), and an average value (40) is determined using the set of error values (this process is referred to as "process A").

Then, the error values (10, 50, 50, and 50) are subtracted from the average value (40) to determine a new set of error values (30, -10, -10, and -10) (this process is referred to as "process B").

Then, a standard deviation (30×30+10×10+10×10+10×10=1200, 1200/4=300, √300=10√3=approximately 17) is determined from the new set of error values. Then, the new set is divided by the determined standard deviation (17) to determine a quotient (1, -1, -1, and -1). This process is referred to as "process C". Expression √300 represents the square root of 300.

Then, the maximum value among the determined values is set as a matching degree (1). The value "1" is associated with error E(0,0)=10. In this case, the error value E(0, 0) satisfies E(0, 0)=min{E(i, j)}. That is, there is no displacement between the position at which the registered paper-fingerprint information was obtained and the position at which the current paper-fingerprint information was obtained. If there is any displacement, a matching degree may be determined after the displacement is corrected.

In the matching degree determination process, therefore, the deviation of a minimum error value in a plurality of error values from an average error value of the error values is determined (the processes A and B).

The deviation is divided by the standard deviation to determine a matching degree (the process C).

Finally, the matching degree is compared with a predetermined threshold value to obtain a matching result (this process is referred to as "process D").

The standard deviation is defined as the average of the "differences between error values and a mean (average) value". In other words, the standard deviation is a measure of variations in a set of data.

The deviation is divided by the total variance to determine the degree of smallness of min{E(i, j)} in the set E(i, j) (e.g., min{E(i, j)} is significantly small or slightly small).

If min{E(i, j)} is significantly small in the set E(i, j), it is determined to be valid, and it is determined to be invalid otherwise (the process D).

The reason why it is determined to be valid only when min{E(i, j)} is significantly small in the set E(i, j) is as follows.

It is assumed that the registered paper-fingerprint information and the current paper-fingerprint information were obtained from the same paper. In this case, there must be a position at which the registered paper-fingerprint information and the current paper-fingerprint information significantly match each other (displaced position). At the displaced position, the registered paper-fingerprint information and the current paper-fingerprint information significantly match each other, and the error value E(i, j) will therefore be significantly small.

Even a small deviation from the displaced position causes no correlation between the registered paper-fingerprint information and the current paper-fingerprint information. Thus, the error value E(i, j) will have a large value as usual.

Therefore, the condition where the two pieces of paper-fingerprint information were obtained from the same paper matches the condition where the minimum error value E(i, j) is significantly small in the set E(i, j).

The description will be returned to the paper-fingerprint information matching process shown in FIG. 8.

In step S803, the matching degree of the two pieces of paper-fingerprint information determined in step S802 is compared with a predetermined threshold value to determine the validity. The matching degree is also referred to as "similarity". The result of the comparison between the matching degree and the predetermined threshold value is also referred to as a "matching result". Finally, in step S804, a determination result is output.

The controller unit 11 has been described accordingly.

FIG. 13 shows an example operation screen (user interface) displayed in the image forming apparatus 10. A field 1301 indicates whether or not the image forming apparatus 10 is ready for copying, and also indicates the number of designated copies (in FIG. 13, one copy). The document type selection tab 1304 is a tab for selecting a document type. When the document type selection tab 1304 is pressed, a pop-up menu of three options, text, photograph, and text/photograph modes, is displayed. A finishing tab 1306 is a tab for various finishing setups (e.g., shift soft).

A duplex setting tab 1307 is a tab for making settings for duplex-scanning and duplex-printing to allow scanning of both sides of a sheet and printing on both sides of a sheet. A reading (copy) mode tab 1302 is a tab for selecting a document-reading mode. When the reading mode tab 1302 is pressed, a pop-up menu of three options, color, black, and automatic color selection (ACS) modes, is displayed. When the color mode is selected, color copying is performed. When the black mode is selected, monochrome copying is performed. When the ACS mode is selected, the copy mode is determined according to the monochrome/color determination signal described above.

A tab 1308 is a tab for selecting a paper-fingerprint information registering process. The paper-fingerprint information registering process is described below. A tab 1309 is a tab for selecting the paper-fingerprint information matching process. A tab 1310 is a tab for selecting whether or not a unique value is attached to a print medium when the image forming apparatus 10 receives a print job such as a job for scanning from the scanner unit 13 or PDL printing from the PC 40. When the tab 1310 is pressed once, the CPU 301 sets the print job received by the image forming apparatus 10 so that the unique value described below is printed on the print medium.

When the tab 1310 is pressed once again, the CPU 301 sets the image forming apparatus 10 so as not to print the unique value even if a print job has been received.

Information (not shown) for turning on or off the setting for attaching a unique value is stored and managed in the HDD 304, the RAM 302 if the RAM 302 is non-volatile, the ROM 303, or the like.

FIG. 14 shows an example of a unique-value/paper-fingerprint management table 100.

The unique value is a unique value to be attached to a print medium by the image forming apparatus 10. In a "unique-value-added position information" column of the unique-value/paper-fingerprint management table 100, information indicating the position on the print medium at which the unique value has been attached is stored. In a "paper-fingerprint information" column, as described above, the paper-fingerprint information corresponding to the unique value read from the paper-fingerprint information obtaining unit 507 is stored.

Accordingly, unique values, unique-value-added position information, and paper-fingerprint information are stored in a table format in association with each other.

The unique-value/paper-fingerprint management table 100 may be managed by the HDD 304, the ROM 303, or a non-volatile memory, such as the RAM 302 if the RAM 302 is a non-volatile SRAM, of the image forming apparatus 10, or may be managed by the server 70 residing on the LAN 50.

A print job process when a number is attached as a unique value will now be described.

Figure 15:
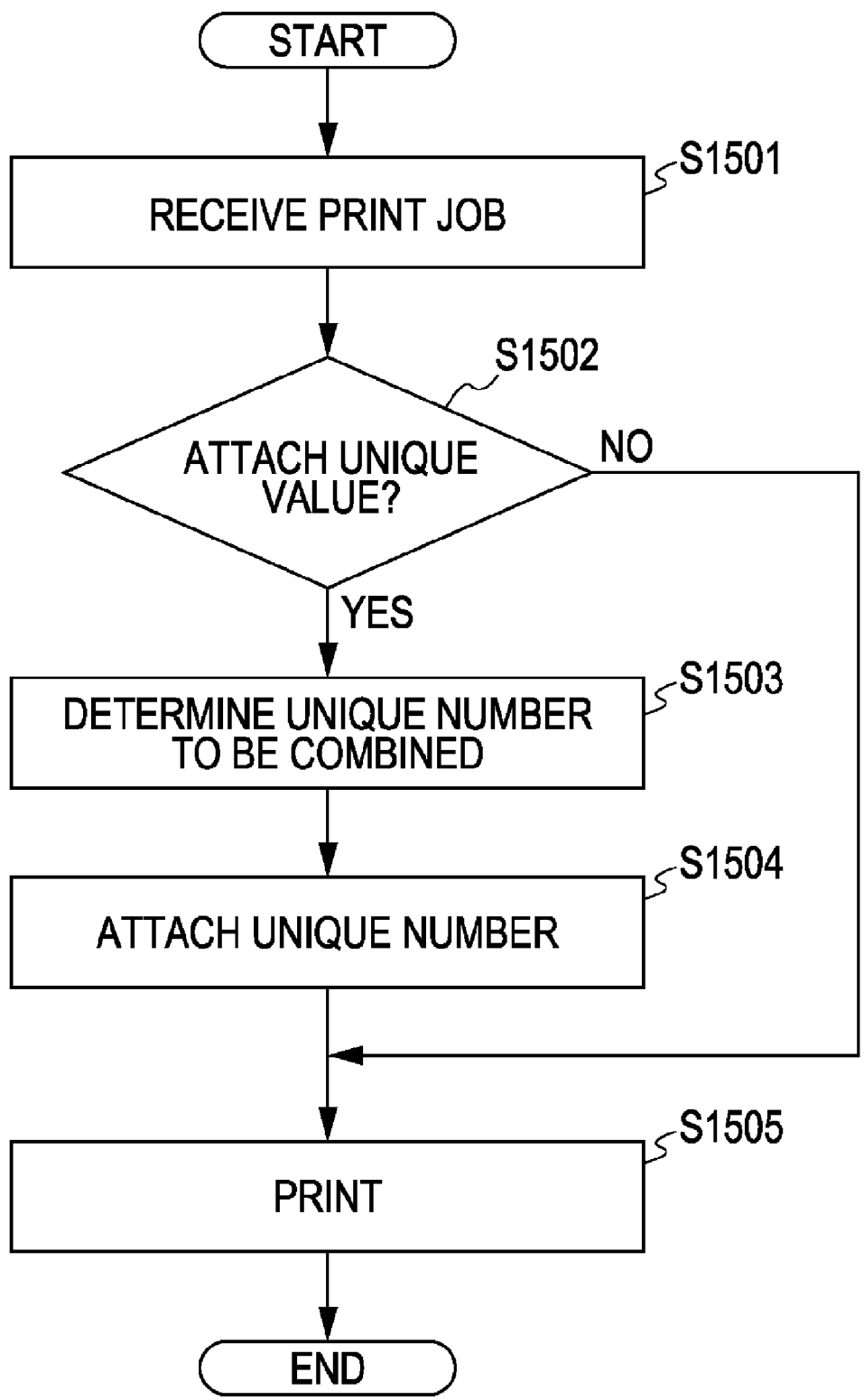
FIG. 15 is a flowchart showing an example of a print job process.

FIG. 15 shows an example of the process when the image forming apparatus 10 receives a print job.

The print job process will be described in the context of an exemplary embodiment where a PDL job is received and a simple number (or a sequence of characters (including a symbol, etc.)) is attached as a unique value.

In step S1501, a PDL print job is received and detected. In step S1502, the CPU 301 determines whether or not the attachment of a unique value has been set. The determination of the attachment setting is performed by referring to the information (not shown) for turning on or off the setting for attaching a unique value, and if the setting is turned on, the attachment setting has been made. The setting for attaching a unique value may be turned on or off by a printer driver in a host computer that transmits PDL data. In the case where the setting is turned on by the printer driver, a unique number is attached even if the information for turning on or off the setting for attaching a unique value is not enabled by the image forming apparatus 10.

Figure 16:
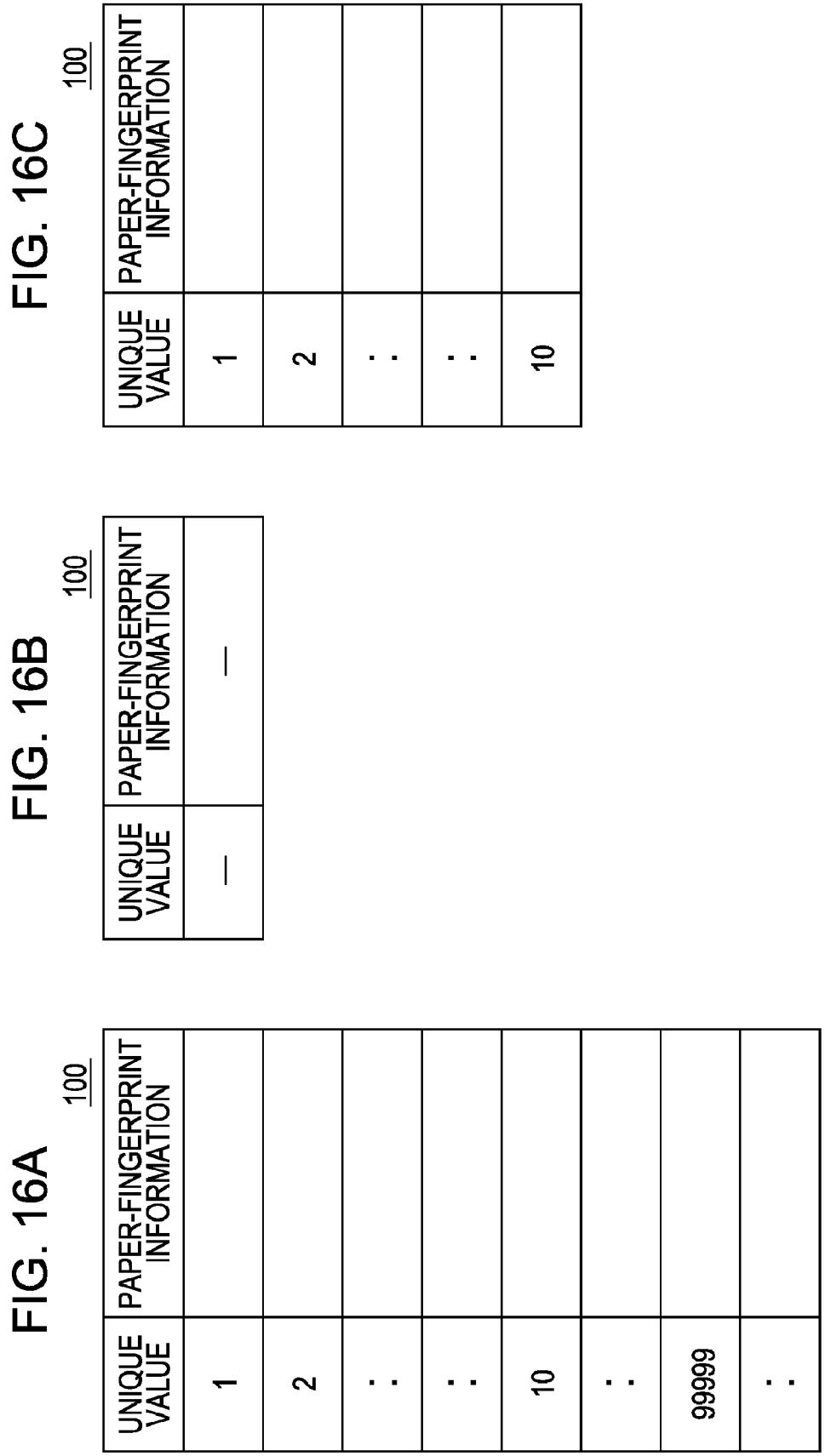
FIGS. 16A to 16C are diagrams showing states of the unique-value/paper-fingerprint management table.

If a unique value is to be attached ("YES" in step S1502), the process proceeds to step S1503, in which a number to be combined is determined. The number may be determined by, as shown in FIG. 16A, determining a uniquely determined value, or the CPU 301 may determine a unique number. The determination process is described in detail below. Then, in step S1504, since the unique value is a simple number, the CPU 301 attaches the number to an image to be printed by the combining unit 327. In step S1505, the printing operation is performed.

If it is determined in step S1502 that the setting of the unique value attachment is turned off ("NO" in step S1502), no number is attached, and an image received as the print job is printed in step S1505 without attaching any number to the image.

FIGS. 16A to 16C show states of the unique-value/paper-fingerprint management table 100 in which attached numbers are managed.

FIG. 16A shows a state of the unique-value/paper-fingerprint management table 100 in the case where numbers to be attached are uniquely determined. FIGS. 16B and 16C show states of the unique-value/paper-fingerprint management table 100 in the case where in step S1503 shown in FIG. 15, the CPU 301 generates a unique number to be attached. In the state shown in FIG. 16B, no print jobs to which numbers are attached have been received.

In the state shown in FIG. 16C, print jobs each to which a number is attached have been received. In FIG. 16C, ten print jobs each to which a number is attached have been received by way of example, and numbers 1 to 10 have been attached to print media. Each time a further print job is received, the CPU 301 updates the unique-value/paper-fingerprint management table 100.

While each of the unique values to be attached is a number, the unique values are not limited to numbers. Any unique value other than numbers, which facilitates scanning and attachment to an image, can be used.

Figure 17:
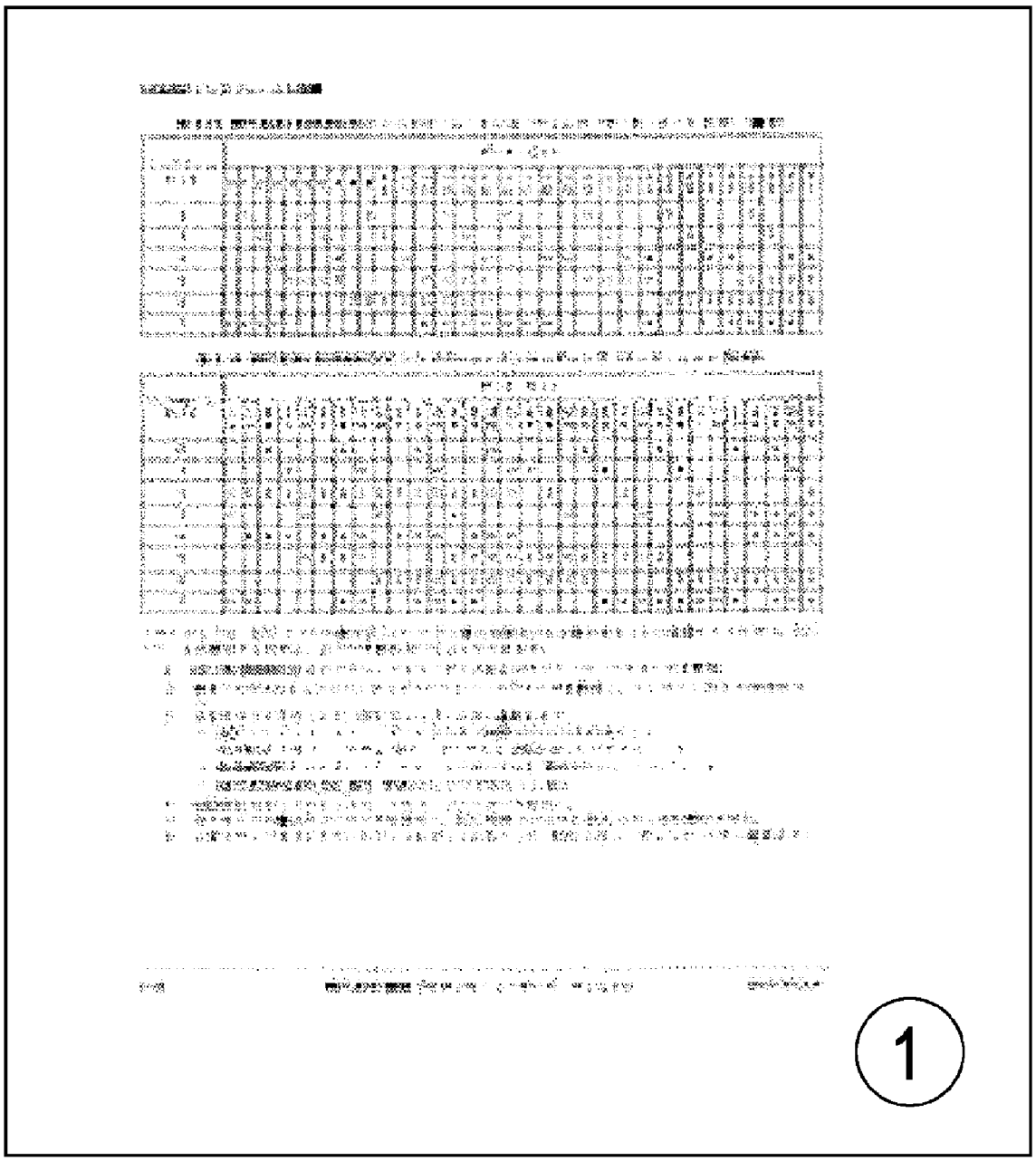
FIG. 17 is a diagram showing an example print medium to which a number is attached as a unique value.

FIG. 17 shows an example print medium printed with a number according to the process flow shown in FIG. 15. In FIG. 17, for example, number "1" is attached as a unique number to a lower right portion of the print medium.

Figure 18:
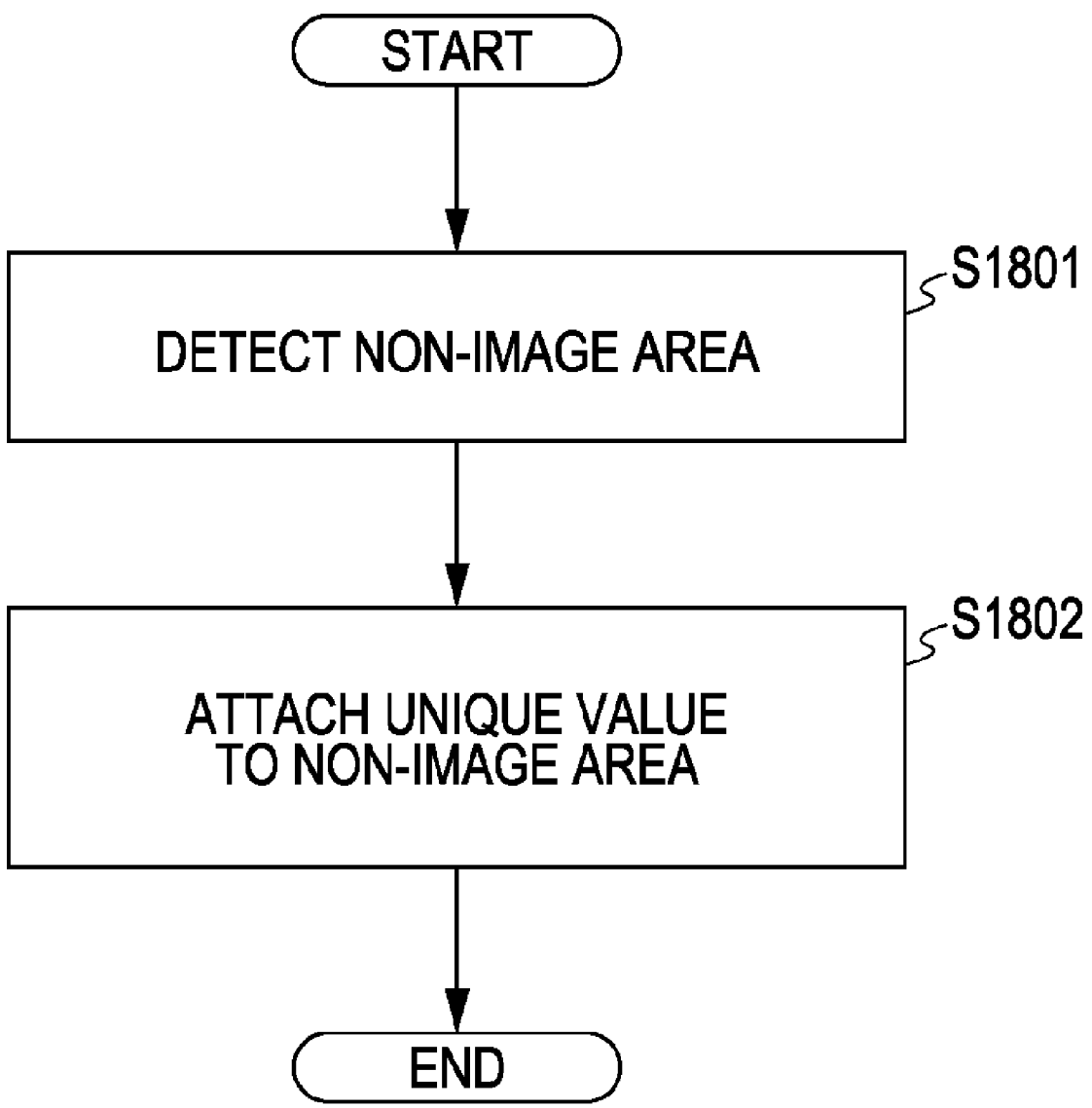
FIG. 18 is a flowchart showing an example of a process for attaching a unique value to a non-image area.

FIG. 18 shows an example process flow when a position to which a unique value is attached is selectable (i.e., is not fixed).

In step S1801, when a unique value is attached in step S1504 shown in FIG. 15, the CPU 301 detects a non-image area in the received image (non-image area detection). For a PDL job, the non-image area can be detected from PDL code.

For a print job input from the scanner unit 13, the non-image area is detected from the attribute information of the text/photograph determining unit 506. Then, in step S1802, a number is attached to the detected non-image area of the image to be printed by the combining unit 327. After the processing of step S1801, the user may select a position within the detected non-image area to which a unique value is to be attached via a user interface.

Figure 19:
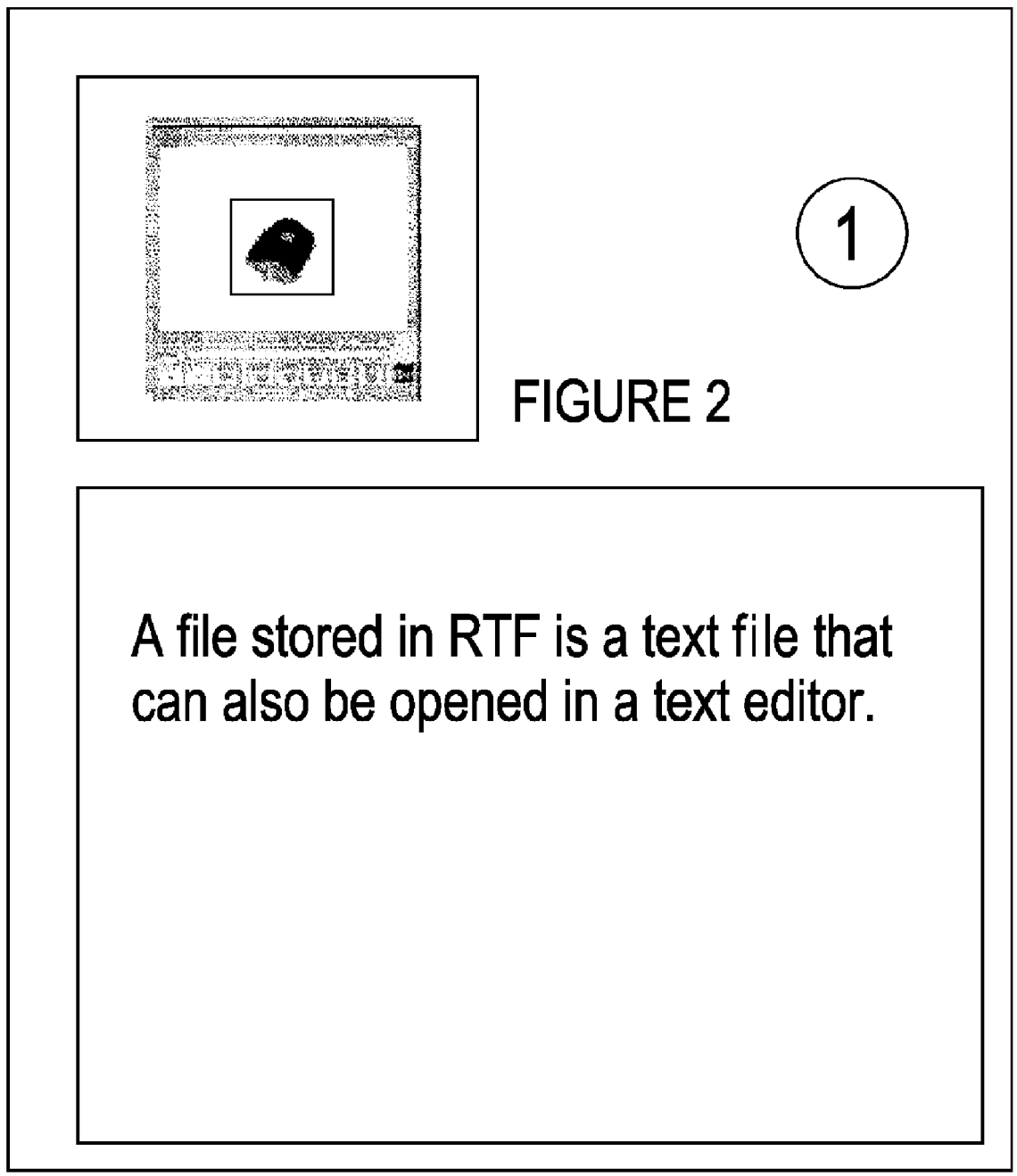
FIG. 19 is a diagram showing an example print medium to which a number is attached as a unique value.

FIG. 19 shows an example print medium printed with a unique number in a detected non-image area.

In the example shown in FIG. 19, the upper right portion of the print medium is detected as a non-image area in step S1801 of the process flow shown in FIG. 18, and number "1" is attached to the portion (detected non-image area) right above the image in step S1802.

Figures 20, 21:
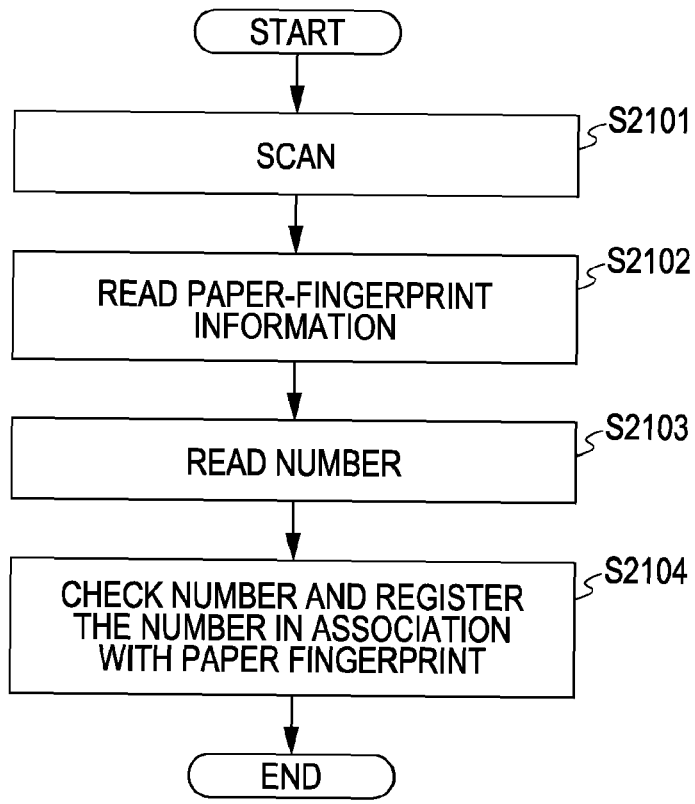
FIG. 20 is a diagram showing a state of the unique-value/paper-fingerprint management table.
FIG. 21 is a flowchart showing an example of a paper-fingerprint registering method (wherein the unique value is formed of a number).

FIG. 20 shows the unique-value/paper-fingerprint management table 100 in the case where positions to which unique numbers are to be attached are selected.

In FIG. 20, two print jobs are received, and numbers (unique values) are attached. The position (the XY coordinates on the paper) to which number "1" is attached as a unique value is stored as unique-value-added position information A in association with the number "1". The position to which number "2" is attached as a unique value is stored as unique-value-added position information B in association with the number "2".

FIG. 21 is a flowchart showing an example of a paper-fingerprint registering method.

In the method shown in FIG. 21, a number is attached as a unique value to a print medium to be registered.

In step S2101, paper to which a number is attached as a unique value is scanned. For example, the print medium shown in FIG. 17 is scanned. In step S2102, the paper-fingerprint information obtaining unit 507 reads paper-fingerprint information from the scanned print medium. Additionally, in step S2103, an attached unique number is read from the scanned print medium.

If the position to which the unique number is attached is fixed, the fixed position is read. If the position to which the unique number is attached has been selected, the unique-value-added position information shown in FIG. 20 is read. In this way, the position to which the number is attached is determined. The CPU 301 compares the detected number with the numbers stored as unique values in the unique-value/paper-fingerprint management table 100. If the detected number matches any number in the unique-value/paper-fingerprint management table 100, in step S2104, the paper-fingerprint information read in step S2102 is stored in the unique-value/paper-fingerprint management table 100 in association with the number, which is the unique value read in step S2103.

FIG. 22 shows an example of the unique-value/paper-fingerprint management table 100 in which unique values and paper-fingerprint information are stored in association with each other in the case where paper fingerprints are registered using the paper-fingerprint registering method shown in FIG. 21. In the example shown in FIG. 22, each of the unique values is a number.

In FIG. 22, ten print jobs are received, and numbers 1 to 10 are stored as unique values. For a unique value of number 1, unique-value-added position information A is stored in the "unique-value-added position information" column of the unique-value/paper-fingerprint management table 100 in association with the number 1. Further, the print medium to which the number 1 is attached is scanned to perform the paper-fingerprint registering method (see FIG. 21), and paper-fingerprint information 1 is stored in association with the number 1 as the unique value of.

For a print medium with a unique value of number 2, no paper fingerprint has been registered yet although the print medium to which the number 2 is attached exists.

For a print medium with a unique value of number 10, as in the print medium with the unique value of number 1, a position Z to which the number is attached and paper-fingerprint information 10 are stored in association with the number 10 as the unique value.

Figure 23:
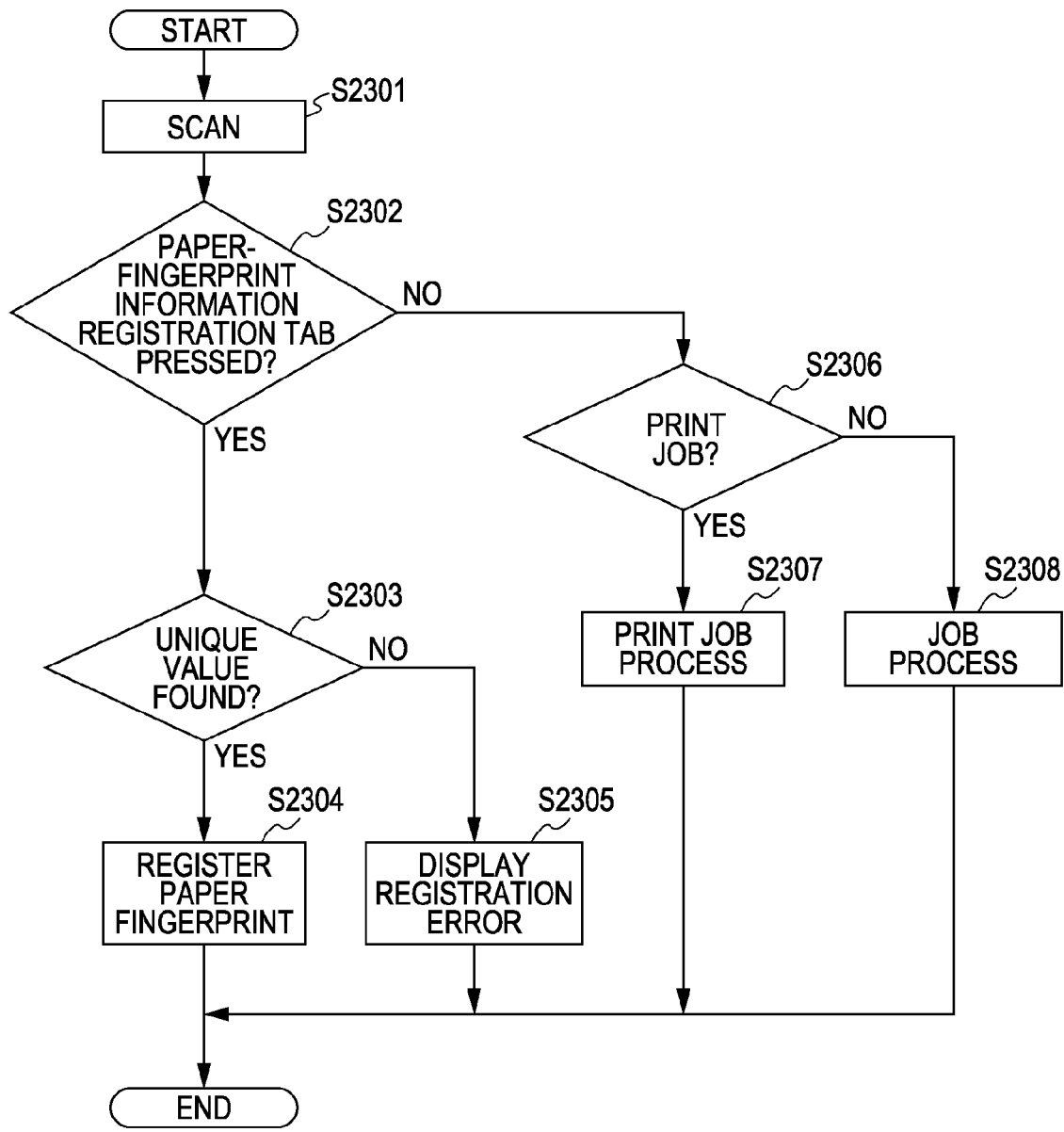
FIG. 23 is a flowchart showing an example of a process when a user registers a paper fingerprint.

FIG. 23 shows an example of the process flow when a user actually registers a paper fingerprint.

In step S2301, a print medium to which a unique value is attached is scanned. In step S2302, the CPU 301 determines whether or not the paper-fingerprint information registration process has been selected by the user using the tab 1308 shown in FIG. 13. If the paper-fingerprint information registration process has been selected ("YES" in step S2302), the process proceeds to step S2303, in which it is determined whether or not the unique value/paper-fingerprint registration table 100 includes a unique value that matches the unique value. If the matching unique value is found ("YES" in step S2303), the process proceeds to step S2304, in which the paper fingerprint information associated with the scanned print medium is registered.

If it is determined in step S2303 that the matching unique value is not found ("NO" in step S2303), the process proceeds to step S2305, in which a paper-fingerprint registration error is displayed on a display panel of the operation unit 12. If it is determined in step S2302 that the paper-fingerprint information registration process has not been selected ("NO" in step S2302), the process proceeds to step S2306, in which the CPU 301 determines whether or not the received job is a print job. If the received job is a print job ("YES" in step S2306), in step S2307, as in the process shown in FIG. 15, it is determined whether or not a number is to be attached to the print medium, and the printing operation is performed. If the received job is not a print job but a job such as a Send, FAX, or BOX storage job ("NO" in step S2306), in step S2308, the corresponding Send, FAX, or BOX storage job is executed.

According to the first exemplary embodiment, therefore, the procedure of paper-fingerprint registration can be reduced. Further, the number of errors in the paper-fingerprint registration can be reduced.

Second Exemplary Embodiment

A second exemplary embodiment of the present invention will be described.

A print job process when code information is attached as a unique value will now be described.

Figure 24:
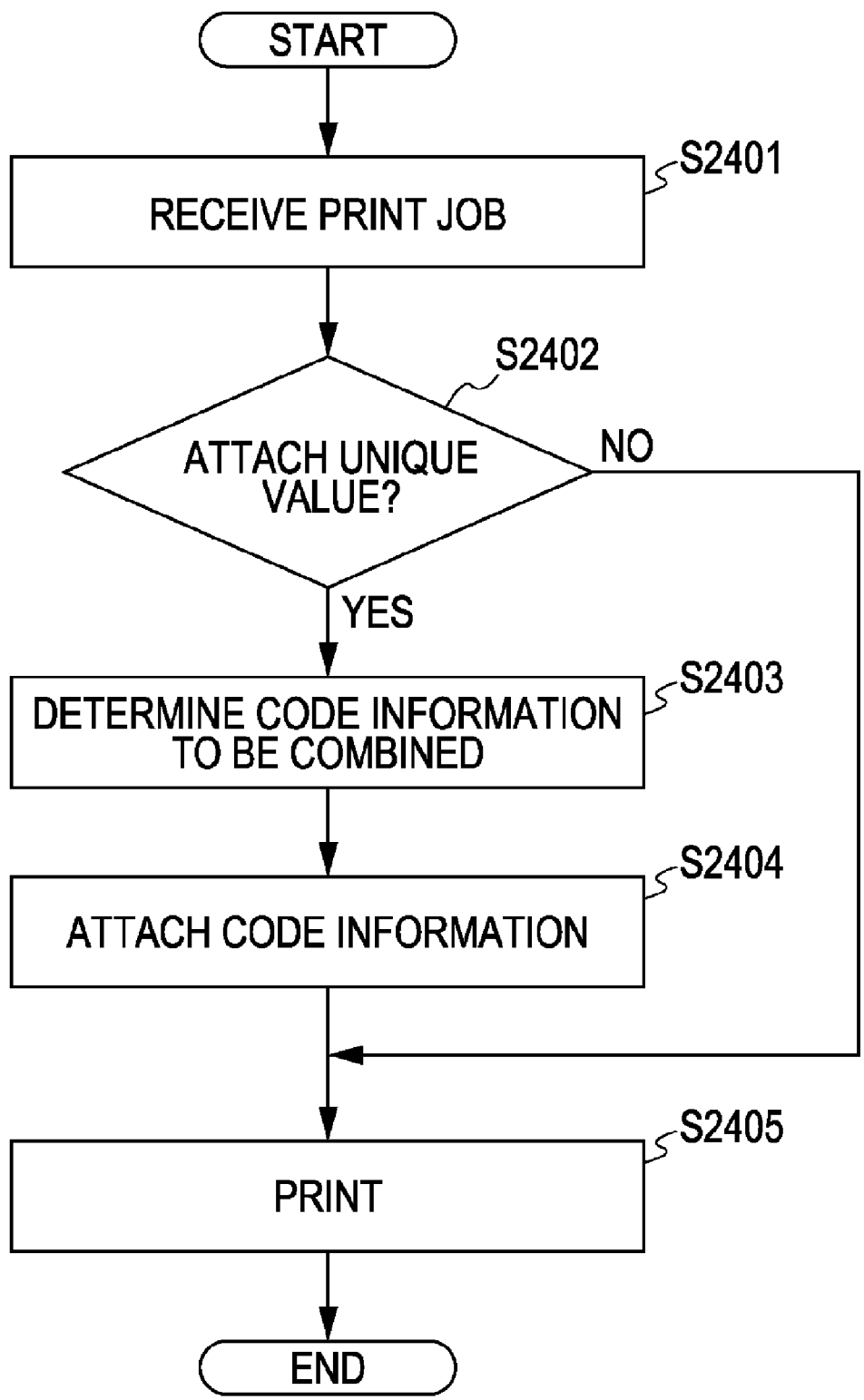
FIG. 24 is a flowchart showing an example of a print job process.

FIG. 24 shows an example of the process when the image forming apparatus 10 receives a print job.

The print job process will be described in the context of an exemplary embodiment where, specifically, a scan job is received and special code information other than a number or sequence of characters, such as two-dimensional barcode, is attached as a unique value.

In step S2401, a scan print job is detected. In step S2402, the CPU 301 determines whether or not the attachment of a unique value has been set. The determination of the attachment setting is performed by referring to information (not shown) for turning on or off the setting for attaching a unique value, and if the setting is turned on, the attachment setting has been made. Alternatively, for a PDL print, the setting can be made by a printer driver (in a manner similar to that in step S1502 shown in FIG. 15).

If a unique value is to be attached ("YES" in step S2402), the process proceeds to step S2403, in which code information to be combined is determined. The code information may be determined from, as shown in FIG. 25A, uniquely determined code information, or the CPU 301 may generate and determine unique code information. The determination process is described in detail below. In the second exemplary embodiment, since the unique value is code information, in step S2404, the CPU 301 attaches the code information to an image to be printed by the encoded-image combining unit 707. In step S2405, the printing operation is performed.

If it is determined in step S2402 that the setting of the unique value attachment is turned off, no code information is attached ("NO" in step S2402), and an image received as the print job is printed in step S2405 without attaching any code information to the image.

FIGS. 25A to 25C show example states of a unique-value/paper-fingerprint management table 100' in which attached code information is managed.

In the value/paper-fingerprint management table 100', code information is stored as a unique value.

FIG. 25A shows a state of the unique-value/paper-fingerprint management table 100' in the case where code information to be attached is uniquely determined.

FIGS. 25B and 25C show states of the unique-value/paper-fingerprint management table 100' in the case where in step S2403 shown in FIG. 24, the CPU 301 generates unique code information to be attached. Instead of generating unique code information by the CPU 301, a dedicated code information generation module (not shown) may be used to generate unique code information.

In the state shown in FIG. 25B, no print jobs to which code information is attached have been received. In the state shown in FIG. 25C, print jobs each to which a piece of code information is attached have been received. In FIG. 25C, ten print jobs each to which a piece of code information is attached have been received by way of example, and pieces of code information 1 to 10 have been attached to print media. Each time a further print job is received, the CPU 301 updates the unique-value/paper-fingerprint management table 100'.

FIG. 26A shows an example print medium printed with a piece of code information according to the process flow shown in FIG. 24. In FIG. 26A, for example, the piece of code information is attached to a lower right portion of the print medium.

FIG. 26B shows an example print medium printed with a piece of code information in a non-image area that is detected in a manner similar to that in step S1801 shown in FIG. 18 according to the first exemplary embodiment when a position to which a unique value is attached is selectable, although the process flow for the selection of the position is omitted.

Figures 27, 28:
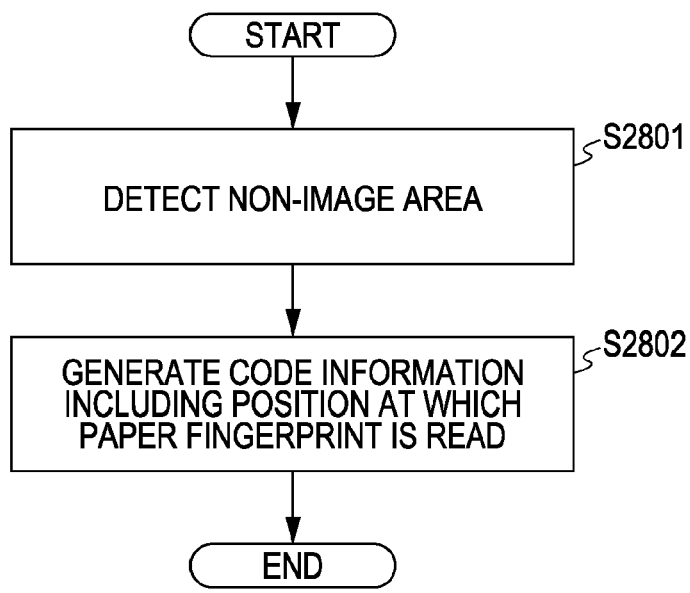
FIG. 27 is a diagram showing a state of the unique-value/paper-fingerprint management table.
FIG. 28 is a flowchart showing an example of a process for including in code information a position at which paper-fingerprint information is read.

FIG. 27 shows an example of the unique-value/paper-fingerprint management table 100' in the case where positions to which pieces of code information are to be attached are selected.

In FIG. 27, two print jobs are received, and pieces of code information are attached. The position to which code information 1 is attached as a unique value is stored as unique-value-added position information A in association with the code information 1. The position to which code information 2 is attached as a unique value is stored as unique-value-added position information B in association with the code information 2.

FIG. 28 is a flowchart showing a process for including in code information a position at which paper-fingerprint information is read.

In step S2801, when code information to be combined is determined in step S2403 shown in FIG. 24, the CPU 301 detects a non-image area in the received image. As described above with reference to step S1801 shown in FIG. 18, for a PDL job, the non-image area can be detected from PDL code. For a print job input from the scanner unit 13, the non-image area is detected from the attribute information of the text/photograph determining unit 506.

Then, in step S2802, the CPU 301 generates code information including the position of the non-image area detected in step S2801 (i.e., the position at which the paper-fingerprint information is read). As described above, instead of generating the code information by the CPU 301, a dedicated code information generation module (not shown) can be used to generate the code information.

Figure 29:
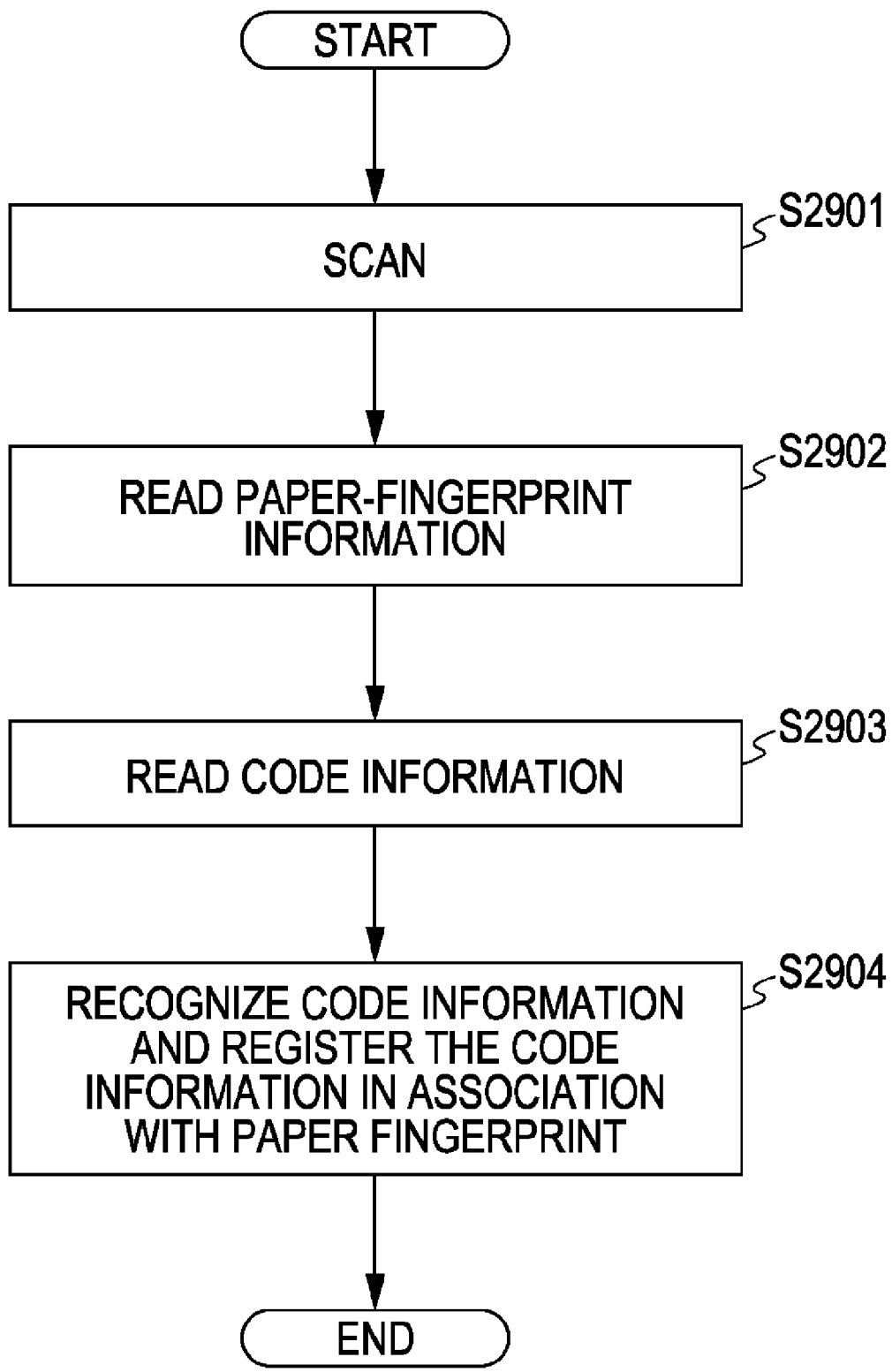
FIG. 29 is a flowchart showing an example of a paper-fingerprint registering method (wherein the unique value is formed of code information).

FIG. 29 is a flowchart showing an example of a paper-fingerprint registering method.

In the method shown in FIG. 29, code information is attached as a unique value to a print medium to be registered.

In step S2901, sheets of paper each to which a piece of code information is attached as a unique value are scanned one by one. For example, the print medium shown in FIG. 26A is scanned. In step S2902, the paper-fingerprint information obtaining unit (paper-fingerprint extracting unit) 507 reads paper-fingerprint information. In step S2903, the attached code information is read by the code detection unit 508. If information concerning the position at which the paper fingerprint is read is included in the code information in the manner described above, the processing of step S2903 is performed before the processing of step S2902, and the paper-fingerprint information is read from the position at which the paper fingerprint is read specified in the code information.

The CPU 301 compares the detected (identified) code information with code information corresponding to the unique values stored in the unique-value/paper-fingerprint management table 100' (i.e., the registered unique values). If the detected code information matches any code information in the unique-value/paper-fingerprint management table 100', in step S2904, the paper-fingerprint information read in step S2902 is stored in the unique-value/paper-fingerprint management table 100' in association with the code information, which is the unique value read in step S2903.

FIG. 30 shows an example of the unique-value/paper-fingerprint management table 100' in which unique values and paper-fingerprint information are stored in association with each other in the case where paper fingerprints are registered using the paper-fingerprint registering method shown in FIG. 29. In the example shown in FIG. 30, each of the unique values is a piece of code information.

In FIG. 30, ten print jobs are received, and pieces of code information 1 to 10 are stored as unique values. For a unique value of code information 1, unique-value-added position information A is stored in the "unique-value-added position information" column of the unique-value/paper-fingerprint management table 100' in association with the code information 1. Further, the print medium to which the code information 1 is attached is scanned to perform the paper-fingerprint registering method (see FIG. 29), and paper-fingerprint information 1 is stored in association with the code information 1 as the unique value.

For a print medium with a unique value of code information 2, no paper fingerprint has been registered yet although the print medium to which the code information 2 is attached exists.

For a print medium with a unique value of code information 10, as in the print medium with the unique value of code information 1, unique-value-added position information Z and paper-fingerprint information 10 are stored in association with the code information 10 as the unique value.

Other Embodiments

The present invention can also be applied to a system including a plurality of devices (e.g., a computer, an interface device, a reader, a printer, etc.) or an apparatus including a single device (such as a multifunction machine, a printer, or a facsimile machine).

It is to be understood that the advantages of the present invention are achieved by providing a system or an apparatus with a storage medium storing program code implementing the steps of the flowcharts in the embodiments described above so that a computer (or a CPU or a micro-processing unit (MPU)) of the system or apparatus can read and execute the program code stored in the storage medium. In this case, the functions of the embodiments described above are achieved by the program code read from the storage medium. Therefore, the program code and the storage medium storing the program code constitute embodiments of the present invention.

Examples of the storage medium for supplying the program code may include a floppy disk, a hard disk, an optical disk, a magneto-optical disk, a compact disk read-only memory (CD-ROM), a compact disc readable (CD-R), a magnetic tape, a non-volatile memory card, and a ROM.

As well as achieving the functions of the embodiment described above by executing the software, a operating system (OS) or the like running on the computer may execute part of or the entirety of actual processing according to the instruction of the software to achieve the functions of the embodiment described above. This also falls within the scope of the present invention.

Further, the program code read from the storage medium may be stored in a memory of a function extension board placed in the computer or a function extension unit connected to the computer, and thereafter a CPU or the like of the function extension board or the function extension unit may execute part of or the entirety of actual processing according to the instruction of the program code to achieve the functions of the embodiments described above.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-328521 filed Dec. 5, 2006, which is hereby incorporated by reference herein in its entirety.

What is claimed is:

1. An image processing apparatus, comprising:
a paper-fingerprint information extracting unit configured to extract paper-fingerprint information from a printing sheet;
an identifying unit configured to identify unique information unique to the printing sheet and attached to the printing sheet;
a comparing unit configured to compare the unique information identified by the identifying unit with previously registered unique information; and
a first storage unit configured to store the unique information identified by the identifying unit and the paper-fingerprint information extracted by the paper-fingerprint extracting unit in association with each other when the comparing unit determines that the unique information identified by the identifying unit matches the previously registered unique information,
wherein attachment-position information concerning a position on the printing sheet to which the unique information is attached is associated with the unique information, and
wherein the identifying unit identifies the unique information from a position on the printing sheet specified by the attachment-position information associated with the unique information.

2. The image processing apparatus according to claim 1, further comprising:
a determining unit configured to determine the unique information;
an attaching unit configured to attach the unique information to the printing sheet; and
a second storage unit configured to store the unique information attached by the attaching unit for registering the unique information.

3. The image processing apparatus according to claim 1, further comprising: a position selecting unit configured to select a position on the printing sheet to which the unique information is to be attached.

4. The image processing apparatus according to claim 1, further comprising: a selecting unit configured to select whether or not the unique information is to be attached to the printing sheet.

5. The image processing apparatus according to claim 1, wherein the unique information comprises a number or a sequence of characters.

6. The image processing apparatus according to claim 1, wherein the unique information comprises special code information other than a number or a sequence of characters.

7. The image processing apparatus according to claim 1, further comprising: a non-image area detecting unit configured to detect a non-image area on the printing sheet,
wherein the unique information is attached to a position within the non-image area detected by the non-image area detecting unit.

8. An image processing apparatus, comprising:
a paper-fingerprint information extracting unit configured to extract paper-fingerprint information from a printing sheet;
an identifying unit configured to identify unique information unique to the printing sheet and attached to the printing sheet;
a comparing unit configured to compare the unique information identified by the identifying unit with previously registered unique information; and
a first storage unit configured to store the unique information identified by the identifying unit and the paper-fingerprint information extracted by the paper-fingerprint extracting unit in association with each other when the comparing unit determines that the unique information identified by the identifying unit matches the previously registered unique information,
wherein the unique information comprises special code information other than a number or a sequence of characters, and
wherein the special code information includes information concerning a position from which the paper-fingerprint information is extracted.

9. An image processing apparatus, comprising—:
a paper-fingerprint information extracting unit configured to extract paper-fingerprint information from a printing sheet;

an identifying unit configured to identify unique information unique to the printing sheet and attached to the printing sheet;
a comparing unit configured to compare the unique information identified by the identifying unit with previously registered unique information;
a first storage unit configured to store the unique information identified by the identifying unit and the paper-fingerprint information extracted by the paper-fingerprint extracting unit in association with each other when the comparing unit determines that the unique information identified by the identifying unit matches the previously registered unique information; and
a non-image area detecting unit configured to detect a non-image area on the printing sheet,
wherein a position within the non-image area detected by the non-image area detecting unit is set as a position from which the paper-fingerprint information is extracted.

10. An image processing apparatus, comprising:
a paper-fingerprint information extracting unit configured to extract paper-fingerprint information from a printing sheet;
an identifying unit configured to identify unique information unique to the printing sheet and attached to the printing sheet;
a comparing unit configured to compare the unique information identified by the identifying unit with previously registered unique information; and
a first storage unit configured to store the unique information identified by the identifying unit and the paper-fingerprint information extracted by the paper-fingerprint extracting unit in association with each other when the comparing unit determines that the unique information identified by the identifying unit matches the previously registered unique information,
wherein the paper-fingerprint information extracting unit extracts paper-fingerprint information based on information concerning a position from which paper-fingerprint information is extracted, wherein the information concerning a position from which paper-fingerprint information is extracted is included in code information.

11. A method, comprising:
extracting paper-fingerprint information from a printing sheet;
identifying unique information unique to the printing sheet and attached to the printing sheet;
comparing the identified unique information with previously registered unique information; and
storing the identified unique information and the extracted paper-fingerprint information in association with each other when it is determined that the identified unique information matches the previously registered unique information,
wherein attachment-position information concerning a position on the printing sheet to which the unique information is attached is associated with the unique information, and
wherein the unique information is identified from a position on the printing sheet specified by the attachment-position information associated with the unique information.

12. The method according to claim 11, further comprising:
determining the unique information;
attaching the unique information to the printing sheet; and
storing the unique information attached to the printing sheet for registering the unique information.

13. The method according to claim 11, further comprising: selecting a position on the printing sheet to which the unique information is to be attached.

14. The method according to claim 11, further comprising: determining whether or not the unique information is to be attached to the printing sheet.

15. The method according to claim 11, wherein the unique information comprises a number or a sequence of characters.

16. The method according to claim 11, wherein the unique information comprises special code information other than a number or a sequence of characters.

17. The method according to claim 11, further comprising: detecting a non-image area on the printing sheet,
wherein the unique information is attached to a position within the detected non-image area.

18. A method, comprising:
extracting paper-fingerprint information from a printing sheet;
identifying unique information unique to the printing sheet and attached to the printing sheet;
comparing the identified unique information with previously registered unique information; and
storing the identified unique information and the extracted paper-fingerprint information in association with each other when it is determined that the identified unique information matches the previously registered unique information,
wherein the unique information comprises special code information other than a number or a sequence of characters, and
wherein the special code information includes information concerning a position from which the paper-fingerprint information is extracted.

19. A method, comprising—:
extracting paper-fingerprint information from a printing sheet;
identifying unique information unique to the printing sheet and attached to the printing sheet:
comparing the identified unique information with previously registered unique information;
storing the identified unique information and the extracted paper-fingerprint information in association with each other when it is determined that the identified unique information matches the previously registered unique information; and
detecting a non-image area on the printing sheet,
wherein a position within the detected non-image area is set as a position from which the paper-fingerprint information is extracted.

20. A method, comprising:
extracting paper-fingerprint information from a printing sheet;
identifying unique information unique to the printing sheet and attached to the printing sheet;
comparing the identified unique information with previously registered unique information; and
storing the identified unique information and the extracted paper-fingerprint information in association with each other when it is determined that the identified unique information matches the previously registered unique information,
wherein the paper-fingerprint information is extracted based on information concerning a position from which paper-fingerprint information is extracted, wherein the information concerning a position from which paper-fingerprint information is extracted is included in code information.

21. A non-transitory storage medium storing instructions which, when executed by an apparatus, cause the apparatus to perform operations, the operations comprising:
   extracting paper-fingerprint information from a printing sheet;
   identifying unique information unique to the printing sheet and attached to the printing sheet;
   comparing the identified unique information with previously registered unique information; and
   storing the identified unique information and the extracted paper-fingerprint information in association with each other when it is determined that the identified unique information matches the previously registered unique information,
   wherein the unique information comprises special code information other than a number or a sequence of characters, and
   wherein the special code information includes information concerning a position from which the paper-fingerprint information is extracted.

22. A non-transitory storage medium storing instructions which, when executed by an apparatus, cause the apparatus to perform operations, the operations comprising:
   extracting paper-fingerprint information from a printing sheet;
   identifying unique information unique to the printing sheet and attached to the printing sheet;
   comparing the identified unique information with previously registered unique information;
   storing the identified unique information and the extracted paper-fingerprint information in association with each other when it is determined that the identified unique information matches the previously registered unique information; and
   detecting a non-image area on the printing sheet,
   wherein a position within the detected non-image area is set as a position from which the paper-fingerprint information is extracted.

23. A non-transitory storage medium storing instructions which, when executed by an apparatus, cause the apparatus to perform operations, the operations comprising:
   extracting paper-fingerprint information from a printing sheet;
   identifying unique information unique to the printing sheet and attached to the printing sheet;
   comparing the identified unique information with previously registered unique information; and
   storing the identified unique information and the extracted paper-fingerprint information in association with each other when it is determined that the identified unique information matches the previously registered unique information,
   wherein the paper-fingerprint information is extracted based on information concerning a position from which paper-fingerprint information is extracted, wherein the information concerning a position from which paper-fingerprint information is extracted is included in code information.

* * * * *